(12) United States Patent
Yamada et al.

(10) Patent No.: US 9,443,124 B2
(45) Date of Patent: Sep. 13, 2016

(54) BIOMETRIC AUTHENTICATION DEVICE AND BIOMETRIC INFORMATION PROCESSING DEVICE

(71) Applicant: FUJITSU LIMITED, Kawasaki-shi, Kanagawa (JP)

(72) Inventors: Shigefumi Yamada, Sagamihara (JP); Narishige Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/715,777

(22) Filed: May 19, 2015

(65) Prior Publication Data

US 2015/0248575 A1    Sep. 3, 2015

Related U.S. Application Data

(62) Division of application No. 13/428,253, filed on Mar. 23, 2012.

(30) Foreign Application Priority Data

May 6, 2011    (JP) .................................. 2011-103726

(51) Int. Cl.
    *G06K 9/00*        (2006.01)
(52) U.S. Cl.
    CPC ....... *G06K 9/00033* (2013.01); *G06K 9/00067* (2013.01); *G06K 2009/00932* (2013.01)
(58) Field of Classification Search
    None
    See application file for complete search history.

(56) References Cited

U.S. PATENT DOCUMENTS

2008/0063244 A1* 3/2008 Tanaka ............... G06K 9/00033
                                                       382/115
2008/0253619 A1    10/2008 Hagino et al.
                       (Continued)

FOREIGN PATENT DOCUMENTS

| EP | 2128820 | 12/2009 |
|---|---|---|
| EP | 2138954 | 12/2009 |
| EP | 2506188 | 10/2012 |

(Continued)

OTHER PUBLICATIONS

Partial European Search Report mailed by EPO and corresponding to European Patent Application No. 1 2161467.1 on Sep. 4, 2012.

(Continued)

*Primary Examiner* — Chan Park
*Assistant Examiner* — Elisa Rice
(74) *Attorney, Agent, or Firm* — Fujitsu Patent Center

(57) ABSTRACT

A fingerprint image obtaining unit 1 obtains a fingerprint image of multiple fingers. A vein image obtaining unit 3 obtains a palm vein image. An authentication information DB 6 stores reference vein characteristic information, and a reference direction of a predetermined finger in a reference palm vein image for which the reference vein characteristic information is obtained. A reference obtaining unit 20 detects a longitudinal direction of a predetermined finger based on the fingerprint image. A position correcting unit 40 corrects the palm vein image based on the longitudinal direction of the predetermined finger, and the reference direction of the predetermined finger. A vein characteristic information extracting unit 4 obtains vein characteristic information from a corrected palm vein image. A verification processing unit 32 matches the vein characteristic information obtained with the reference vein characteristic information for authentication.

2 Claims, 30 Drawing Sheets

(56) References Cited

U.S. PATENT DOCUMENTS

2008/0273762 A1    11/2008   Kato
2010/0087987 A1     4/2010   Huang et al.

FOREIGN PATENT DOCUMENTS

| JP | 1995-114640 | 5/1995 |
| --- | --- | --- |
| JP | 2000-194828 | 7/2000 |
| JP | 2003-263640 | 9/2003 |
| JP | 2006-277341 | 10/2006 |
| JP | 2006-331239 | 12/2006 |
| JP | 2008-009555 | 1/2008 |
| JP | 2008-70926 A | 3/2008 |
| JP | 2008-134862 | 6/2008 |
| JP | 2008-198083 | 8/2008 |
| JP | 2011-065302 | 3/2011 |

OTHER PUBLICATIONS

A. Yuksel et al., "Biometric Identification Through Hand Vein Patterns", Emerging Techniques and Challenges for Hand-Based Biometrics, XP31740469 (Aug. 22, 2010), pp. 1-6.
E. Yoruk et al., "Shape-Based Hand Recognition", Vo. 15, No. 7, XP55024101 (Jul. 1, 2006), pp. 1803-1815.
E. Yörük et al., "Hand Biometrics", Image and Vision Computing, vol. 24, No. 5, XP027994860 (May 1, 2006), pp. 483-497.
Extended European Search Report of EP Patent Application 12161467.1, mailed Jun. 5, 2013.
Li, S. Z. et al., "Hand Shape", Encyclopedia of Biometrics; [Springer Reference], Springer, New York, US, Aug. 1, 2009, pp. 684-685, XP007921662.
Jain, A. et al., "Hand Databases and Evaluation", Encyclopedia of Biometrics; [Springer Reference], Springer, New York, US, Aug. 27, 2009, pp. 672-682, XP007921678.
Jain, A. et al., "Biometric System Design Overview", Encyclopedia of Biometrics Passage; [Springer Reference], Springer, New York, US, Aug. 27, 2009, pp. 138-139, XP007921679.
Shahin, M. K. et al., "A Multimodal Hand Vein, Hand Geometry, and Fingerprint Prototype Design for High Security Biometrics", Biomedical Engineering Conference, 2008. CIBEC 2008, Cairo International, IEEE, Piscataway, NJ, USA, pp. 1-6, XP031425955.
Li, S. et al., "Encyclopedia of biometrics passage", Encyclopedia of biometrics passage; Biometric Systems, Agent-Based, [Springer Reference], Springer, New York, US, Aug. 27, 2009, pp. 142-143, XP007921706.
Japanese Office Action of Japanese Patent Application No. 2011-103726 mailed Sep. 9, 2014 with partial English translation.
USPTO, (RICE) Supplemental Notice of Allowability, Apr. 17, 2015, in parent U.S. Appl. No. 13/428,253 [now allowed].
USPTO, (RICE) Notice of Allowance and Notice of Allowability, Feb. 20, 2015, in parent U.S. Appl. No. 13/428,253 [now allowed].
USPTO, (RICE) Final Office Action, Sep. 26, 2014, in parent U.S. Appl. No. 13/428,253 [now allowed].
USPTO, (RICE) Non-Final Office Action, Mar. 4, 2014, in parent U.S. Appl. No. 13/428,253 [now allowed].
USPTO, (RICE) Restriction Requirement, Oct. 10, 2013, in parent U.S. Appl. No. 13/428,253 [now allowed].
Japanese Office Action mailed Jun. 16, 2015 for corresponding Japanese Patent Application No. 2014-226681, with Partial English Translation, 5 pages.
European Office Action dated Jun. 29, 2016 for corresponding European Patent Application No. 12161467.1, 5 pages.

\* cited by examiner

| | INDEX FINGER | MEDICINAL FINGER | MIDDLE FINGER |
|---|---|---|---|
| FINGERPRINT CENTER | (13, 145) | (74, 155) | (32, 163) |
| WRINKLE DIRECTION (ANGLE) | 14 | -6 | 7 |
| FINGER DIRECTION (ANGLE) | 104 | 84 | 97 |

| CROSS POINT OF DIRECTIONS OF FINGERS AT BOTH ENDS | (55, -20) |
|---|---|
| REFERENCE POSITION | (42, 164) |
| REFERENCE DIRECTION (ANGLE) | 94 |

FIG.15
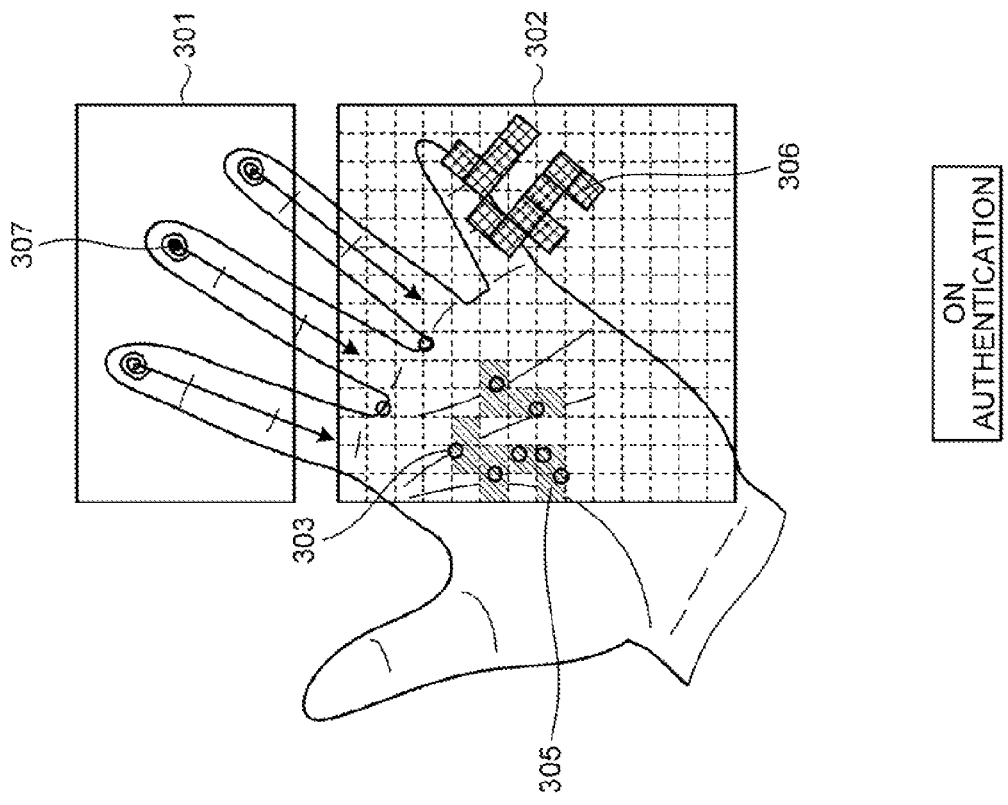
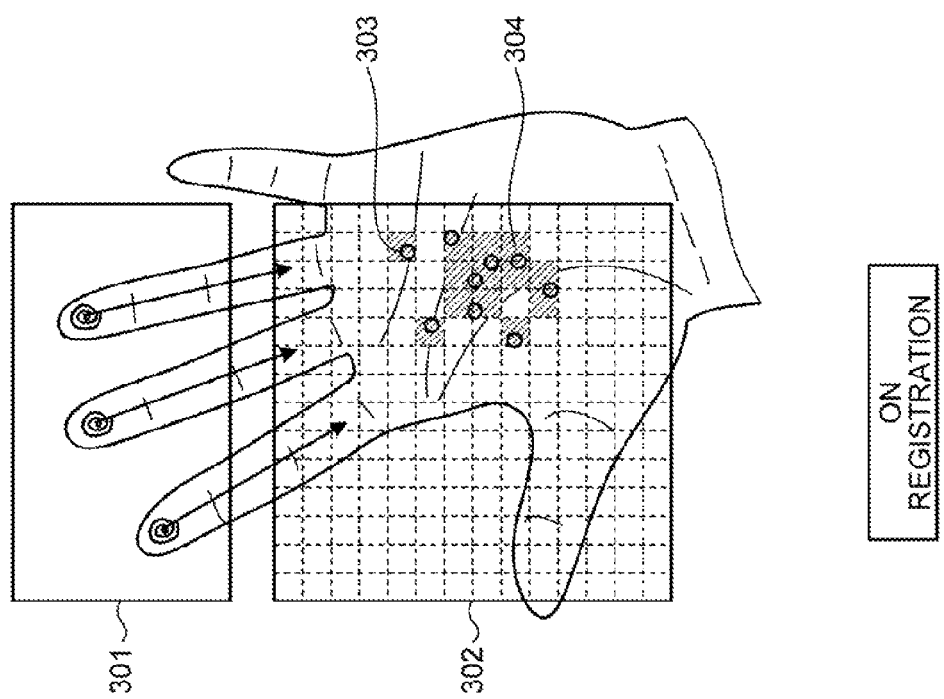

310

| NUMBER OF DIVIDED BLOCKS | NUMBER OF COMMON BLOCKS |
|---|---|
| 14 × 14 | 10 |

| HISTORY NUMBER | AUTHENTICATION SUCCESS TIME | USER ID | REFERENCE POSITION | REFERENCE DIRECTION |
|---|---|---|---|---|
| 000000000 | 2010/3/20 15:00:10 | admin | (42, 164) | 94 |
| 000000001 | 2011/2/1 9:10:10 | USER001 | (33, 150) | 90 |
| 000000002 | 2011/2/1 9:10:11 | USER005 | (40, 153) | 89 |
| 000000003 | 2011/2/1 9:15:50 | USER031 | (41, 151) | 94 |
| ... | ... | ... | ... | ... |

| ANALYSIS TARGET | AVERAGE OF REFERENCE POSITION DIFFERENCES | AVERAGE OF REFERENCE DIRECTION DIFFERENCES |
|---|---|---|
| TOTAL | (-2, -10) | -1 |
| USER001 | (0, -9) | -4 |
| ... | ... | ... |

BIOMETRIC AUTHENTICATION DEVICE AND BIOMETRIC INFORMATION PROCESSING DEVICE

CROSS-REFERENCE TO RELATED APPLICATION

This application is a divisional of application Ser. No. 13/428,253, filed Mar. 23, 2012, which is based upon and claims the benefit of priority of the prior Japanese Patent Application No. 2011-103726, filed on May 6, 2011, the entire contents of which are incorporated herein by reference.

FIELD

The embodiments discussed herein are directed to a biometric authentication device, a biometric information processing device, a biometric authentication system, a biometric authentication server, a biometric authentication client, and a biometric authentication device controlling method.

BACKGROUND

In a biometric authentication system, information indicating characteristics of a body (which will be called "characteristic information" below) is previously enrolled as biometric information in the system and a similarity between the enrolled biometric information and biometric information obtained on authentication is determined thereby to execute personal authentication. In principle, the biometric information obtained on the enrollment will not strictly match with the biometric information obtained on the authentication, and when it is determined that the similarity is low, even a person enrolled in the system may fail the authentication. A threshold for determining the similarity is reduced and thus a possibility that the person fails the authentication (false rejection rate) decreases, but in this case, a possibility that a stranger is erroneously determined as authenticated (false acceptance rate) increases. Typically, the false rejection rate and the false acceptance rate are in a contradictory relationship, but there is known a method in which multiple types of biometric information are used to execute personal authentication, thereby simultaneously reducing both the rates and improving an authentication precision.

There is a technique in which a palm vein pattern is used as biometric information. The technique is such that characteristic information of a user's palm vein pattern is enrolled as biometric information in a system and a similarity between the input vein pattern on authentication and the characteristic information is determined. The techniques using a palm vein pattern includes the following conventional techniques. For example, there is a conventional technique in which both a device into which finger images are to be input and a device into which a palm image is to be input are integrally arranged. There is a conventional technique in which a passcode and a palm print are used for authentication. There is a conventional technique in which an image of wrinkles of a finger's joint is generated as a high-contrast image. Further, there is a conventional technique in which a target position for obtaining one type of biometric information is corrected based on a target position for obtaining another type of biometric information. Furthermore, there is a conventional technique in which the amount of finger tips' positional deviation occurring between the fingerprint enrollment and the fingerprint verification is calculated to execute authentication.

Patent Literature 1: Japanese Laid-open Patent Publication No. 2006-331239
Patent Literature 2: Japanese Laid-open Patent Publication No. 07-114640
Patent Literature 3: Japanese Laid-open Patent Publication No. 2000-194828
Patent Literature 4: Japanese Laid-open Patent Publication No. 2006-277341
Patent Literature 5: Japanese Laid-open Patent Publication No. 2008-198083

However, it is preferable that the entire palm is shot for an image of the palm vein pattern, but only the left half or right half of the palm can be shot depending on the shape of a guide on which the palm is to be placed or the position at which the palm is placed. For example, in the conventional technique in which a device into which finger images are to be input and a device into which a palm image is to be input are integrally arranged, the position on which the palm is to be placed is restricted and it is difficult to shot the entire palm. In the conventional technique in which one position of a target is corrected based on another position of the target whose biometric information is to be obtained, a schematic size of a body part or a contour of a fingerprint pattern is used. However, the size of a body part or the shape of the fingerprint pattern is largely different between persons, and thus the position is difficult to accurately correct. Further, in the conventional technique in which the amount of finger tips' positional deviation occurring between the fingerprint enrollment and the fingerprint verification is calculated to execute authentication, one item of biometric information is authenticated for detecting the amount of positional deviation of another item of biometric information to be obtained. Therefore, when the conventional technique is applied to a one-to-many authentication system, for example, so many items of biometric information have to be verified, which is complicated. There is a technique in which part of a palm is rotated and shot. However, a complicated processing is needed for stereoscopically recognizing the palm, and it can take much time to take the image.

As stated above, when the degree of freedom of how to place a palm is increased, it takes much time to take an image, and the degree of freedom of how to place a palm is restricted for performing an image-taking processing in a short time, and thus a proper image cannot be obtained.

SUMMARY

According to an aspect of an embodiment of the invention, a biometric authentication device includes a fingerprint image obtaining unit for obtaining a fingerprint image of multiple fingers; a vein image obtaining unit for obtaining a palm vein image in the hand for which the fingerprint image is obtained by the fingerprint image obtaining unit; a storing unit for storing reference vein characteristic information as an authentication reference, and a reference direction of a predetermined finger in a reference palm vein image for which the reference vein characteristic information is obtained; a detecting unit for detecting a longitudinal direction of the predetermined finger based on the fingerprint image obtained by the fingerprint image obtaining unit; a position correcting unit for correcting the palm vein image obtained by the vein image obtaining unit based on the longitudinal direction of the predetermined finger detected by the detecting unit and the reference direction of the predetermined finger stored in the storing unit; a vein characteristic information obtaining unit for obtaining vein characteristic information from a palm vein image corrected by the position correcting unit; and an authenticating unit for matching vein characteristic information obtained by the vein characteristic information obtaining unit with the reference vein characteristic information stored in the storing unit for authentication.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 4 is a diagram illustrating exemplary information of each finger's fingerprint;

FIG. 5 is a diagram illustrating exemplary parameters for moving a palm vein image;

FIG. 15 is a diagram for explaining authentication using block division;

FIG. 23 is a diagram illustrating exemplary history information on a palm-placed position;

DESCRIPTION OF EMBODIMENTS

Preferred embodiments of the present invention will be explained with reference to accompanying drawings. The following embodiments do not intend to limit the biometric authentication device, the biometric information processing device, the biometric authentication system, the biometric authentication server, the biometric authentication client and the biometric authentication device controlling method disclosed in the present application.

[a] First Embodiment

Figure 1:
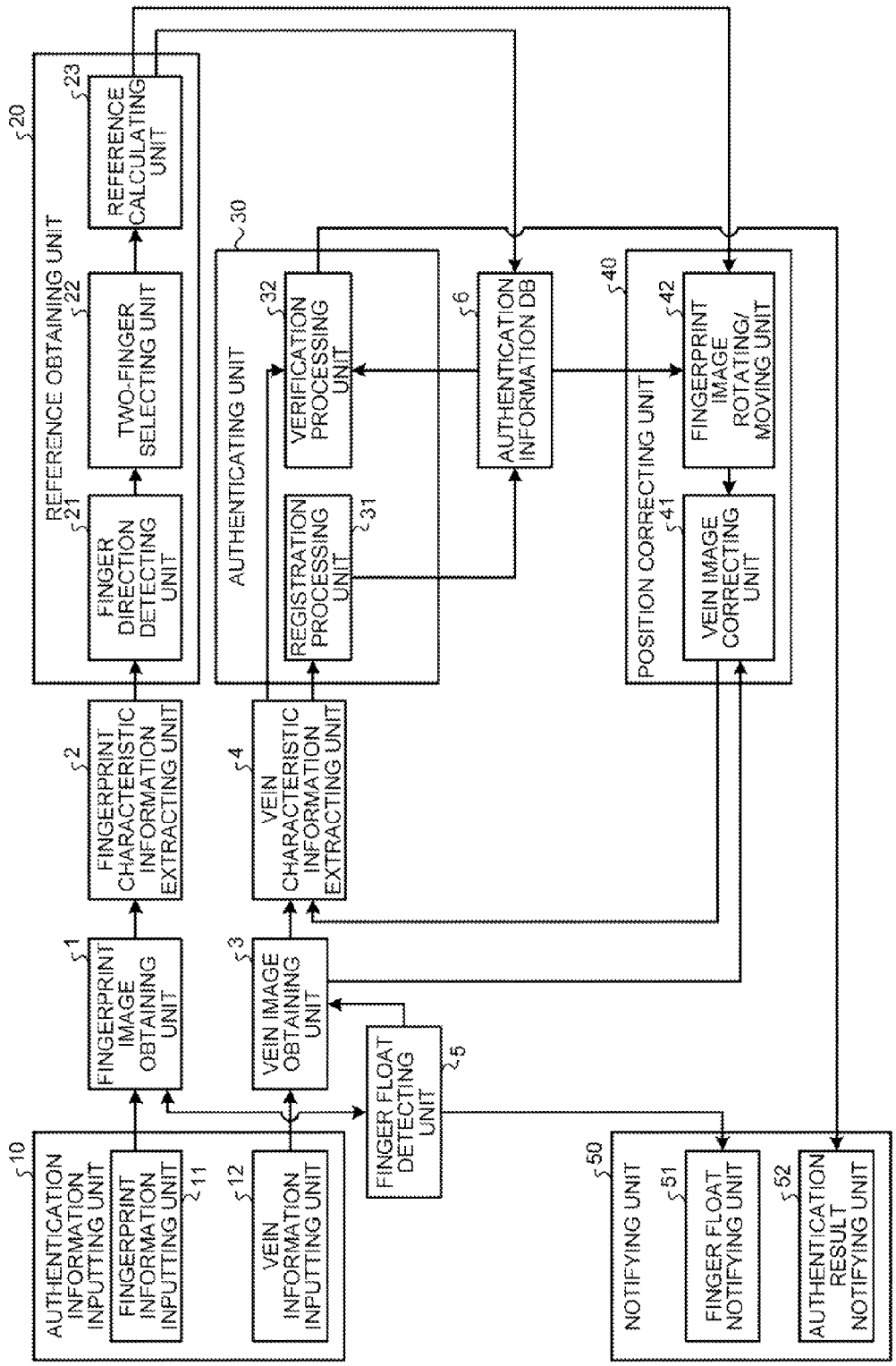
FIG. 1 is a block diagram of a biometric authentication device according to a first embodiment.

FIG. 1 is a block diagram of a biometric authentication device according to a first embodiment. As illustrated in FIG. 1, the biometric authentication device according to the present embodiment has a fingerprint image obtaining unit 1, a fingerprint characteristic information extracting unit 2, a vein image obtaining unit 3, a vein characteristic information extracting unit 4, a finger float detecting unit 5 and an authentication information data base (DB) 6. The biometric authentication device according to the present embodiment further has an authentication information inputting unit 10, a reference obtaining unit 20, an authenticating unit 30, a position correcting unit 40 and a notifying unit 50.

The authentication information inputting unit 10 has a fingerprint information inputting unit 11 and a vein information inputting unit 12.

The fingerprint information inputting unit 11 is an inputting device which is provided with a region on which fingers are to be placed and which has a sensor for detecting fingerprint information of the fingers placed on the region. The placement of fingers may be of a contact type that fingers contact on a sensor face or of a non-contact type that fingers pass over the sensor. A user places the fingers on the region on which fingers are to be placed of the fingerprint information inputting unit 11, thereby to input the fingers' fingerprint information. The present embodiment will be described assuming that the user inputs the fingerprints of the index finger, the middle finger and the medicinal finger by use of the fingerprint information inputting unit 11. The biometric authentication device according to the present embodiment is operable by any finger's fingerprint as a fingerprint to be input.

The vein information inputting unit 12 is an inputting device which is provided with a region on which a palm is to be placed and which has a sensor for detecting vein information of the palm placed on the region. The user may input the palm vein information by placing the palm on the region on which a palm is to be placed of the vein information inputting unit 12. The fingerprint information and the palm vein information may be collectively referred to as "biometric information" below.

The fingerprint image obtaining unit 1 captures the fingerprints from fingerprint information detected by the fingerprint information inputting unit 11 and thereby obtains a fingerprint image of the fingerprints of the index finger, the middle finger and the medicinal finger. Then, the fingerprint image obtaining unit 1 outputs the obtained fingerprint image to the finger float detecting unit 5. Further, when receiving a notification of detection of wrinkles from the finger float detecting unit 5, the fingerprint image obtaining unit 1 outputs the obtained fingerprint image to the fingerprint characteristic information extracting unit 2.

The finger float detecting unit 5 is input with the fingerprint image of the fingerprints of the index finger, the middle finger and the medicinal finger from the fingerprint image obtaining unit 1. Then, the finger float detecting unit 5 extracts the wrinkles of the joints from the received fingerprint image. When being able to extract the wrinkles, the finger float detecting unit 5 notifies the detection of the wrinkles to the fingerprint image obtaining unit 1 and the vein image obtaining unit 3. To the contrary, when not being able to extract the wrinkles, the finger float detecting unit 5 notifies, to a finger float notifying unit 51 described later, that a finger is floating. In this way, it is detected that the wrinkles of the fingers' joints are not contained in the fingerprint information, and thus the user is notified to input the wrinkles of the joints, thereby accurately obtaining the information on the wrinkles of the joints. Thus, directions of the fingers may be accurately calculated by use of the wrinkles of the joints and the fingerprint characteristic information.

The present embodiment is provided with the finger float detecting unit 5 for accurately obtaining an image of fingers' wrinkles, but the finger float detecting unit 5 may not be provided when the image of the wrinkles may be accurately obtained by instructing the user to accurately place the fingers.

The fingerprint characteristic information extracting unit 2 is input with the image of the fingerprints of the index finger, the middle finger and the medicinal finger from the fingerprint image obtaining unit 1. Then, the fingerprint characteristic information extracting unit 2 obtains the fingerprint characteristic information on the respective fingers, which is the characteristic information for determining fingerprint patterns. The fingerprint characteristic information is information indicating a position and a direction of ridge ending points or bifurcation points of fingerprint, for example. Then, the fingerprint characteristic information extracting unit 2 outputs the fingerprint characteristic information and the fingerprint images of the index finger, the middle finger and the medicinal finger to a finger direction detecting unit 21 of the reference obtaining unit 20.

The reference obtaining unit 20 has the finger direction detecting unit 21, a two-finger selecting unit 22 and a reference calculating unit 23.

Figure 2:
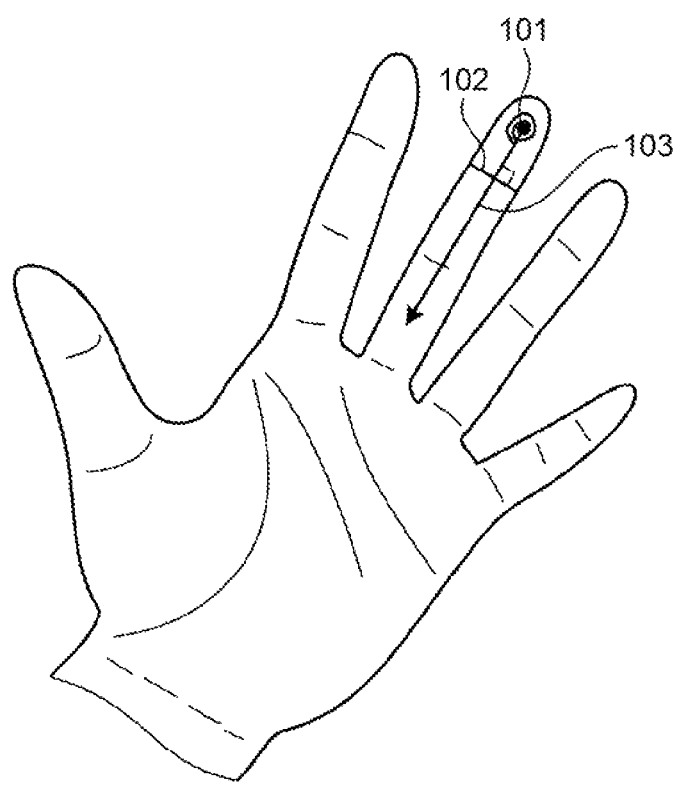
FIG. 2 is a diagram for explaining how to detect a finger direction.

FIG. 2 is a diagram for explaining how to detect a finger direction. In FIG. 2, the middle finger is described by way of example for a convenient explanation, but actually the same processing is performed on all the fingers. The finger direction detecting unit 21 receives the fingerprint characteristic information and the fingerprint images of the index finger, the middle finger and the medicinal finger from the fingerprint characteristic information extracting unit 2. The finger direction detecting unit 21 finds a fingerprint center 101 illustrated in FIG. 2 of each finger's fingerprint from the received fingerprint characteristic information on each finger. Further, the finger direction detecting unit 21 extracts wrinkles formed near the distal interphalangeal joint (the first joint) from the received fingerprint image. Then, the finger direction detecting unit 21 extracts a possible direction 102 indicating a direction in which the wrinkles extend. For example, the finger direction detecting unit 21 may find the possible direction by performing a frequency analysis or repeatedly extracting two points at random thereby to find a direction and to take the statistic. Herein, the calculation of the possible direction by the finger direction detecting unit 21 is not particularly limited. Then, the finger direction detecting unit 21 takes a perpendicular from the fingerprint center 101 to the possible direction 102 obtained from the wrinkles. Then, the finger direction detecting unit 21 assumes a direction 103 in which the perpendicular is taken as a longitudinal direction of the finger. The longitudinal direction of the finger will be simply referred to as "finger direction" below.

The finger direction detecting unit 21 finds the finger directions of the index finger, the middle finger and the medicinal finger, respectively. Then, the finger direction detecting unit 21 outputs information on the respective finger directions of the index finger, the middle finger and the medicinal finger and position information on the fingerprint centers of the respective fingers to the two-finger selecting unit 22.

The two-finger selecting unit 22 is input with the information on the respective finger directions of the index finger, the middle finger and the medicinal finger and the position information on the fingerprint centers of the respective fingers from the finger direction detecting unit 21. The two-finger selecting unit 22 specifies the fingers at both ends from the information on the directions of the respective fingerprints and the position information on the fingerprint centers. In the present embodiment, the two-finger selecting unit 22 specifies the index finger and the medicinal finger as the fingers at both ends. Then, the two-finger selecting unit 22 assumes the directions of the index finger and the medicinal finger as the directions of the fingers at both ends. Then, the two-finger selecting unit 22 outputs the information on the fingers at both ends, the information of the respective finger directions of the index finger, the middle finger and the medicinal finger as well as the position information on the fingerprint centers of the respective fingers to the reference calculating unit 23.

Figure 3:
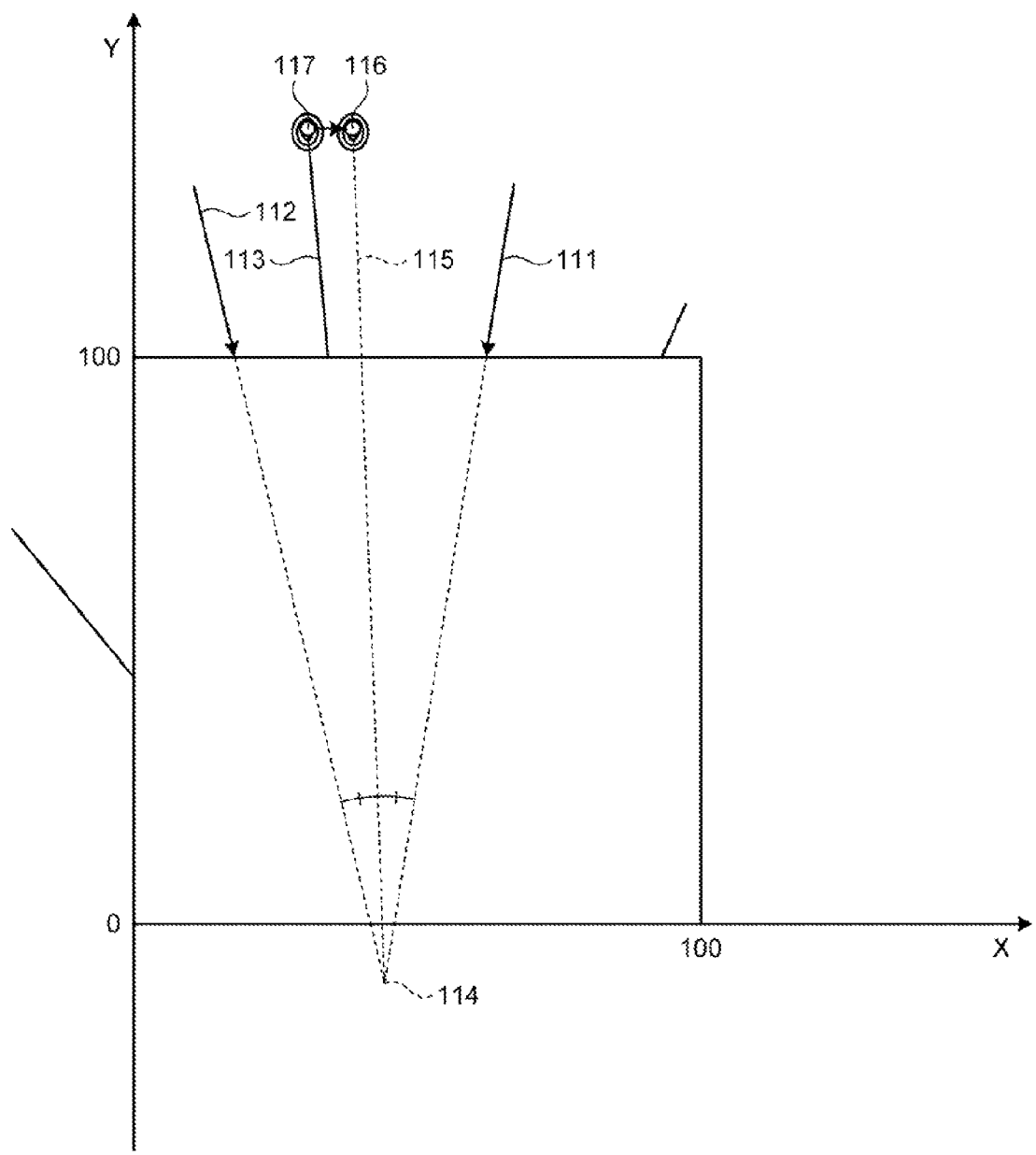
FIG. 3 is a diagram for explaining how to calculate a reference direction and a reference position by use of fingers' directions at both ends.

FIG. 3 is a diagram for explaining how to calculate a reference direction and a reference position by use of the directions of the fingers at both ends. FIG. 4 is a diagram illustrated exemplary information on the fingerprints of the respective fingers. The reference calculating unit 23 receives the information on the fingers at both ends, the information on the respective finger directions of the index finger, the middle finger and the medicinal finger as well as the position information on the fingerprint centers of the respective fingers from the two-finger selecting unit 22. In the present embodiment, the reference calculating unit 23 is input with, as the information on the fingers at both ends, a finger direction 111 of FIG. 3 as the direction of the medicinal finger and a finger direction 112 of FIG. 3 as the direction of the index finger. More specifically, the reference calculating unit 23 obtains a position coordinate of the finger center of each finger, a direction of the angle-indicated wrinkles, and an angle-indicated finger direction as depicted in a table 120 of FIG. 4, for example. In this way, the finger direction 111 and the finger direction 112 of FIG. 3 are indicated with the angles of the finger directions indicated in the table 120.

Then, the reference calculating unit 23 determines whether the fingers are spread from the information on the respective finger directions. For example, the reference calculating unit 23 determines whether the fingers are spread based on whether an angle formed by the directions of the fingers at both ends exceeds a predetermined threshold.

When the fingers are spread, the reference calculating unit 23 finds a cross point 114 of the finger direction 111 and the finger direction 112 as illustrated in FIG. 3. Then, the reference calculating unit 23 finds an internal angle bisector 115 of the angle formed between the finger direction 111 and the finger direction 112. The internal angle bisector 115 is offset from an actually-detected finger direction 113 of the middle finger. The reference calculating unit 23 rotates a fingerprint image 117 of the middle finger about the cross point 114 to be finally matched with the internal angle bisector 115. Thereby, the reference calculating unit 23 moves the fingerprint image 117 of the middle finger to a fingerprint image 116 of the middle finger. Then, the reference calculating unit 23 assumes the fingerprint image 116 of the middle finger of FIG. 3 as the reference position. Further, the reference calculating unit 23 assumes a direction toward the cross point 114 along the internal angle bisector 115 from the reference position as the reference direction. Herein, FIG. 5 is a diagram illustrating exemplary parameters for moving the palm vein image. As in a table 121 of FIG. 5, the reference calculating unit 23 obtains a coordinate indicating the cross point of the directions of the fingers at both ends as information on the cross point 114. The reference calculating unit 23 obtains a coordinate of the fingerprint image 116 of the middle finger as information on the reference position. The reference calculating unit 23 obtains an angle of the internal angle bisector 115 as information on the reference direction.

When the fingers are not spread, the reference calculating unit 23 specifies a finger not selected by the two-finger selecting unit 22. In the present embodiment, the reference calculating unit 23 specifies the middle finger as the finger not selected by the two-finger selecting unit 22. Then, the reference calculating unit 23 assumes a coordinate of the fingerprint center of the middle finger as the reference position, and the direction of the middle finger as the reference direction. The present embodiment is such that a finger other than the fingers at both ends is used to set the reference position and the reference direction for enabling the authentication to be performed even when the fingers are not spread in order to avoid a processing delay, but the reference calculating unit 23 may notify an instruction to spread the fingers to the user for securing the precision. Further, the reference calculating unit 23 may notify an instruction to spread the fingers to the user only on the enrollment, and may set the reference position and the reference direction by use of a finger other than the fingers at both ends on the authentication. In this way, accurate information can be obtained on the enrollment, and rapid authentication can be performed by use of the accurate information on the authentication.

The reference calculating unit 23 outputs the found reference position and reference direction to the authentication information DB 6 in the case of the enrollment processing. The reference calculating unit 23 outputs the found reference position and reference direction to a fingerprint image rotating/moving unit 42 in the case of the authentication processing.

The vein image obtaining unit 3 captures a palm vein from the vein information detected by the vein information inputting unit 12 and thereby obtains a palm vein image. Then, when receiving the notification of the detection of the wrinkles from the finger float detecting unit 5, the vein image obtaining unit 3 outputs the obtained palm vein image to the vein characteristic information extracting unit 4 in the case of the enrollment processing. To the contrary, in the case of the authentication processing, when receiving the notification of the detection of the wrinkles from the finger float detecting unit 5, the vein image obtaining unit 3 outputs the obtained palm vein image to a vein image correcting unit 41 described later.

In the enrollment processing, the vein characteristic information extracting unit 4 is input with the palm vein image from the vein image obtaining unit 3. Then, the vein characteristic information extracting unit 4 extracts vein characteristic information from the palm vein image. Herein, the vein characteristic information is information indicating the directions in which the veins extend, for example. Then, the vein characteristic information extracting unit 4 outputs the extracted vein characteristic information to a enrollment processing unit 31.

To the contrary, in the case of the authentication processing, the vein characteristic information extracting unit 4 is input with the palm vein image corrected by the vein image correcting unit 41 described later from the vein image correcting unit 41. Then, the vein characteristic information extracting unit 4 extracts the vein characteristic information from the palm vein image. Further, the vein characteristic information extracting unit 4 outputs the extracted vein characteristic information to a verification processing unit 32 described later.

The authentication information DB 6 is a storing device such as memory or hard disc. Then, the authentication information DB 6 receives an instruction from the enrollment processing unit 31, and stores the vein characteristic information input from the enrollment processing unit 31 in association with the reference direction and the reference position input from the reference calculating unit 23 on the enrollment.

The authentication information DB 6 maintains and manages biometric information such as the vein characteristic information, the reference direction and the reference position at the time of multiple users' enrollment, for example. The biometric information of multiple users are maintained and managed in this way so that the biometric authentication device compares the biometric information owned in the authentication information DB 6 with the input biometric information thereby to identify the biometric information of the user him/herself from the biometric information of all the users without ID input, thereby enabling the authentication.

The position correcting unit 40 has the vein image correcting unit 41 and the fingerprint image rotating/moving unit 42.

The fingerprint image rotating/moving unit 42 is input with the reference direction and the reference position on the authentication in the case of the authentication processing. Further, the fingerprint image rotating/moving unit 42 obtains the reference direction and the reference position on the user's enrollment from the authentication information DB 6.

Then, the fingerprint image rotating/moving unit 42 calculates an angle formed between the reference direction on the enrollment and the reference direction on the authentication. Then, the fingerprint image rotating/moving unit 42 assumes a calculated angle as a rotation angle. Next, the fingerprint image rotating/moving unit 42 calculates a distance between the reference position on the enrollment and the reference position on the authentication. Then, the fingerprint image rotating/moving unit 42 assumes a calculated distance as a moving distance.

The fingerprint image rotating/moving unit 42 outputs the rotation angle and the moving distance to the vein image correcting unit 41.

The vein image correcting unit 41 is input with the palm vein image from the vein image obtaining unit 3 in the case of the authentication processing. Further, the vein image correcting unit 41 is input with the rotation angle and the moving distance from the fingerprint image rotating/moving unit 42.

The vein image correcting unit 41 rotates and moves the palm vein image by the rotation angle about the reference position of the received palm vein image on the authentication. Further, the vein image correcting unit 41 moves the rotated and moved palm vein image in parallel by the moving distance.

The vein image correcting unit 41 outputs the palm vein image corrected by the rotating/moving and the parallel moving to the vein characteristic information extracting unit 4.

The authenticating unit 30 has the enrollment processing unit 31 and the verification processing unit 32.

The enrollment processing unit 31 is input with the vein characteristic information from the vein characteristic information extracting unit 4 in the case of the enrollment processing. Then, the enrollment processing unit 31 stores the received vein characteristic information in the authentication information DB 6 in association with the reference direction and the reference position on the enrollment calculated by the reference calculating unit 23.

The verification processing unit 32 is input with the vein characteristic information on the authentication from the vein characteristic information extracting unit 4 in the case of the authentication processing. Further, the verification processing unit 32 obtains the vein characteristic information on the enrollment from the authentication information DB 6. Then, the verification processing unit 32 matches the vein characteristic information on the authentication with the vein characteristic information on the enrollment. When the vein characteristic information on the authentication matches with the vein characteristic information on the enrollment, the verification processing unit 32 outputs a notification of the authentication success to an authentication result notifying unit 52. When the vein characteristic information on the authentication does not match with the vein characteristic information on the enrollment, a notification of the authentication failure is output to the authentication result notifying unit 52.

The notifying unit 50 has the finger float notifying unit 51 and the authentication result notifying unit 52.

The finger float notifying unit 51 receives the notification that a finger is floating from the finger float detecting unit 5. Then, the finger float notifying unit 51 notifies the user to replace the palm by displaying a message that a finger is floating on a monitor (not illustrated), for example.

The authentication result notifying unit 52 receives a verification result from the verification processing unit 32. Then, the authentication result notifying unit 52 notifies the authentication result to other device operating based on the authentication result or notifies the authentication result to the user by notifying the authentication result on the monitor (not illustrated).

Figure 6:
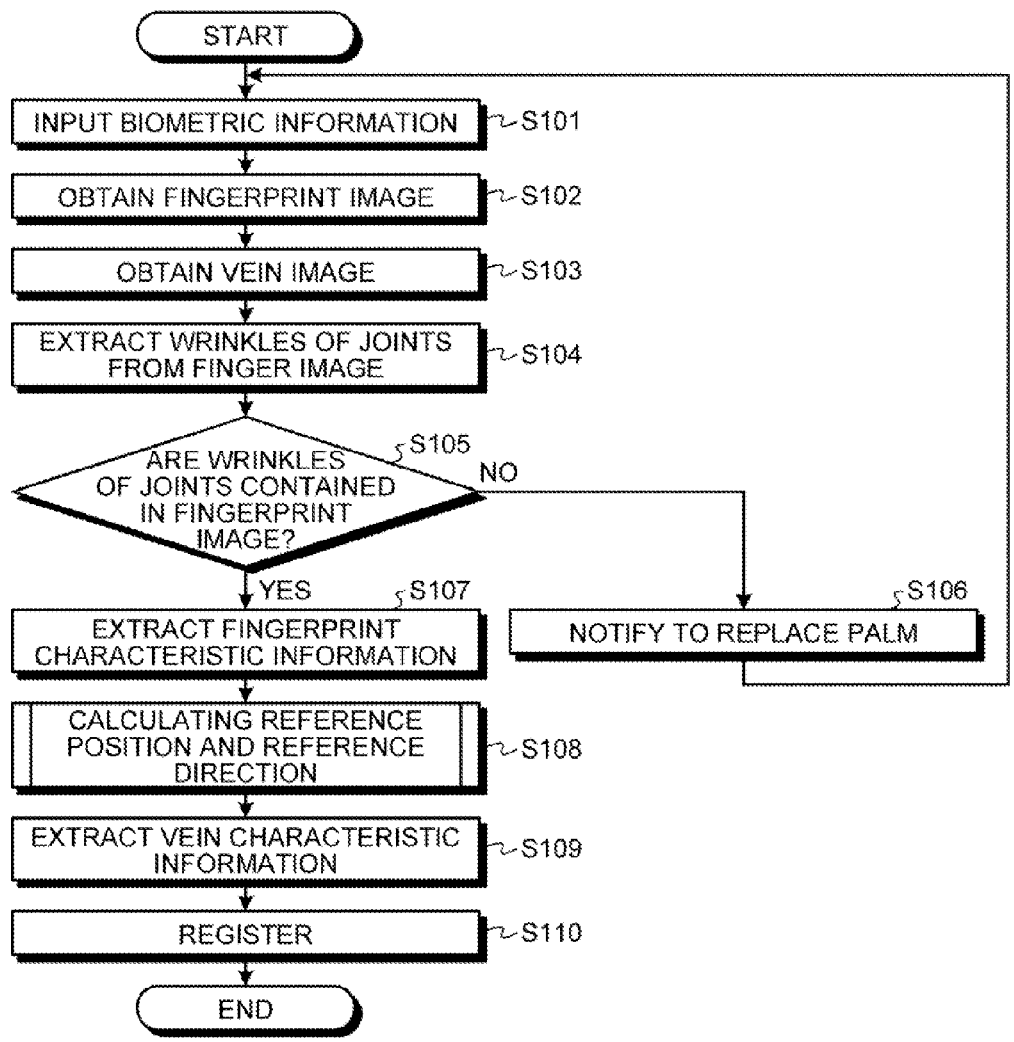
FIG. 6 is a flowchart of a enrollment processing by the biometric authentication device according to the first embodiment.

A flow of the enrollment processing by the biometric authentication device according to the present embodiment will be described below with reference to FIG. 6. FIG. 6 is a flowchart of the enrollment processing by the biometric authentication processing according to the first embodiment.

The user uses the authentication information inputting unit 10 to input the information on the fingerprints of the index finger, the middle finger and the medicinal finger and the information on the palm vein as the biometric information (step S101).

The fingerprint image obtaining unit 1 obtains a fingerprint image from the fingerprint information input from the fingerprint information inputting unit 11 (step S102).

The vein image obtaining unit 3 obtains the palm vein image from the information on the palm vein input from the vein information inputting unit 12 (step S103).

The finger float detecting unit 5 is input with the fingerprint image from the fingerprint image obtaining unit 1. Then, the finger float detecting unit 5 extracts the wrinkles at the joints from the fingerprint image (step S104).

The finger float detecting unit 5 determines whether the wrinkles of the joints are contained in the fingerprint image based on whether the wrinkles of the joints were able to be extracted (step S105). When the wrinkles of the joints are not contained (No in step S105), the finger float detecting unit 5 notifies that a finger is floating to the finger float notifying unit 51. The finger float notifying unit 51 receives the notification that a finger is floating from the finger float detecting unit 5. Then, the finger float notifying unit 51 notifies the user to replace the palm (step S106) and then returns to step S101.

To the contrary, when the wrinkles of the joints are contained (Yes in step S105), the fingerprint characteristic information extracting unit 2 is input with the fingerprint image from the fingerprint image obtaining unit 1. Then, the fingerprint characteristic information extracting unit 2 extracts the fingerprint characteristic information from the received fingerprint image (step S107).

The reference obtaining unit 20 is input with the fingerprint characteristic information from the fingerprint characteristic information extracting unit 2. Then, the reference obtaining unit 20 calculates the reference position and the reference direction based on the received fingerprint characteristic information (step S108). Then, the reference obtaining unit 20 outputs the reference position and the reference direction on the enrollment to the authentication information DB 6.

The vein characteristic information extracting unit 4 is input with the palm vein image from the vein image obtaining unit 3. Then, the vein characteristic information extracting unit 4 extracts the vein characteristic information from the received palm vein image (step S109).

The enrollment processing unit 31 receives the vein characteristic information from the vein characteristic information extracting unit 4. The enrollment processing unit 31 stores the vein characteristic information in the authentication information DB 6 in association with the reference position and the reference direction on the enrollment calculated by the reference obtaining unit 20, and enrolls the biometric information on the user (step S110).

Figure 7:
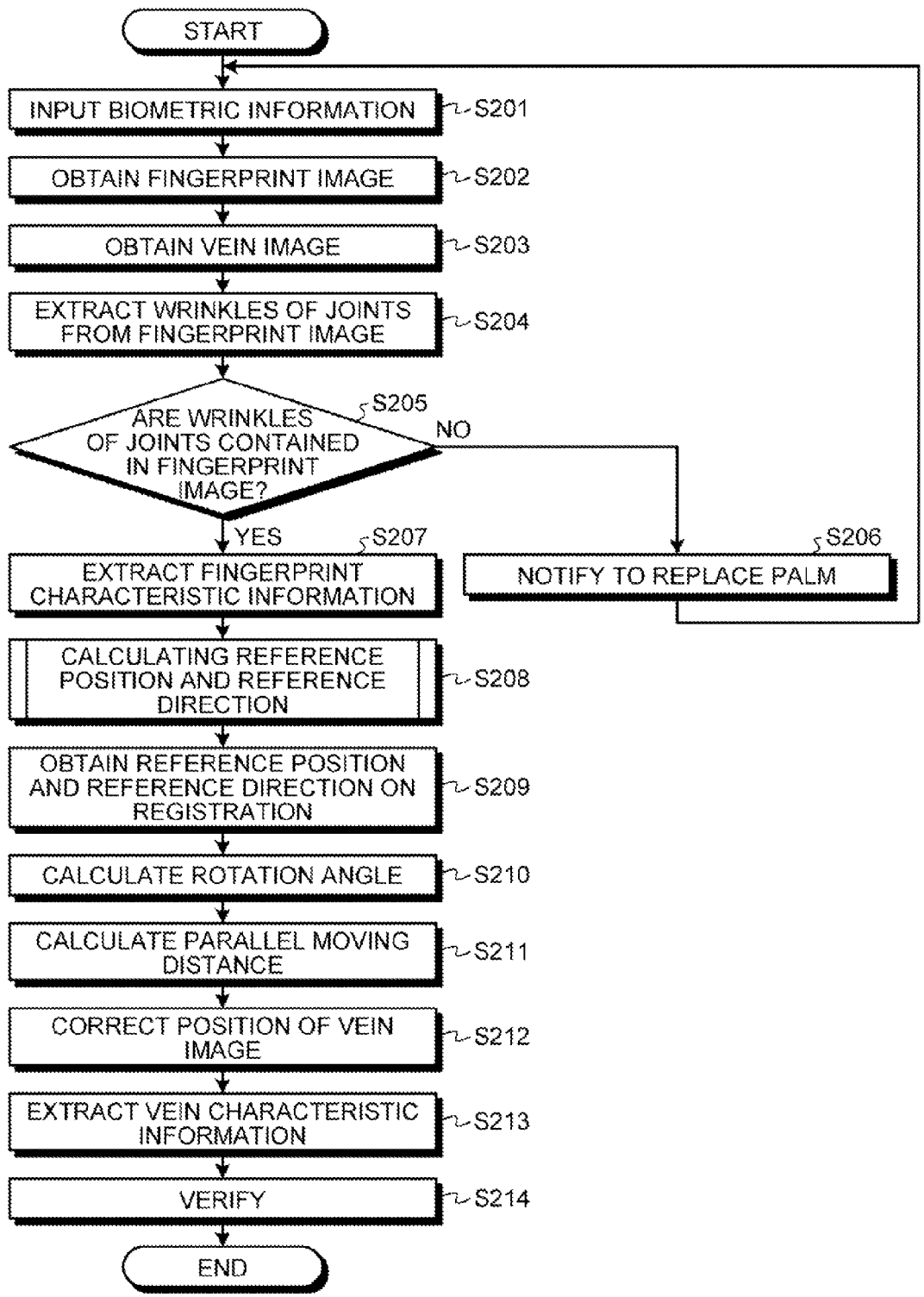
FIG. 7 is a flowchart of an authentication processing by the biometric authentication device according to the first embodiment.

A flow of the authentication processing by the biometric authentication device according to the present embodiment will be described below with reference to FIG. 7. FIG. 7 is a flowchart of the authentication processing by the biometric authentication device according to the first embodiment.

The user uses the authentication information inputting unit 10 to input the information on the fingerprints of the index finger, the middle finger and the medicinal finger and the information on the palm vein as the biometric information (step S201).

The fingerprint image obtaining unit 1 obtains the fingerprint image from the fingerprint information input from the fingerprint information inputting unit 11 (step S202).

The vein image obtaining unit 3 obtains the palm vein image from the palm vein information input from the vein information inputting unit 12 (step S203).

The finger float detecting unit 5 is input with the fingerprint image from the fingerprint image obtaining unit 1. Then, the finger float detecting unit 5 extracts the wrinkles of the joints from the fingerprint image (step S204).

The finger float detecting unit 5 determines whether the wrinkles of the joints are contained in the fingerprint image based on whether the wrinkles of the joints were able to be extracted (step S205). When the wrinkles of the joint are not contained (No in step S205), the finger float detecting unit 5 notifies that a finger is floating to the finger float notifying unit 51. The finger float notifying unit 51 receives the notification that a finger is floating from the finger float detecting unit 5. Then, the finger float notifying unit 51 notifies the user to replace the palm (step S206) and then returns to step S201.

To the contrary, when the wrinkles of the joints are contained (Yes in step S205), the fingerprint characteristic information extracting unit 2 is input with the fingerprint image from the fingerprint image obtaining unit 1. Then, the fingerprint characteristic information extracting unit 2 extracts the fingerprint characteristic information from the received fingerprint image (step S207).

The reference obtaining unit 20 is input with the fingerprint characteristic information from the fingerprint characteristic information extracting unit 2. Then, the reference obtaining unit 20 calculates the reference position and the reference direction from the received fingerprint characteristic information (step S208). Then, the reference obtaining unit 20 outputs the reference position and the reference direction on the authentication to the fingerprint image rotating/moving unit 42.

The fingerprint image rotating/moving unit 42 obtains the reference direction and the reference position on the enrollment from the authentication information DB 6 (step S209).

Then, the fingerprint image rotating/moving unit 42 calculates an angle formed between the reference direction on the enrollment and the reference direction on the authentication as a rotation angle (step S210).

Then, the fingerprint image rotating/moving unit 42 calculates a distance between the reference position on the enrollment and the reference position on the authentication as a parallel moving distance (step S211).

The vein image correcting unit 41 is input with the palm vein image from the vein image obtaining unit 3. Further, the vein image correcting unit 41 is input with the reference position on the authentication, the rotation angle and the parallel moving distance from the fingerprint image rotating/moving unit 42. Then, the vein image correcting unit 41 rotates the received palm vein image by the rotation angle about the reference position and further moves it by the moving distance to correct the position of the palm vein image (step S212).

The vein characteristic information extracting unit 4 is input with the corrected palm vein image from the vein image correcting unit 41. Then, the vein characteristic information extracting unit 4 extracts the vein characteristic information from the received palm vein image (step S213).

The verification processing unit 32 receives the vein characteristic information from the vein characteristic information extracting unit 4. Further, the verification processing unit 32 obtains the vein characteristic information on the enrollment from the authentication information DB 6. Then, the verification processing unit 32 matches the vein characteristic information on the authentication with the vein characteristic information on the enrollment (step S214).

The verification processing unit 32 notifies success and failure of the authentication to the authentication result notifying unit 52. Then, the authentication result notifying unit 52 notifies the user of the authentication result.

Figure 8:
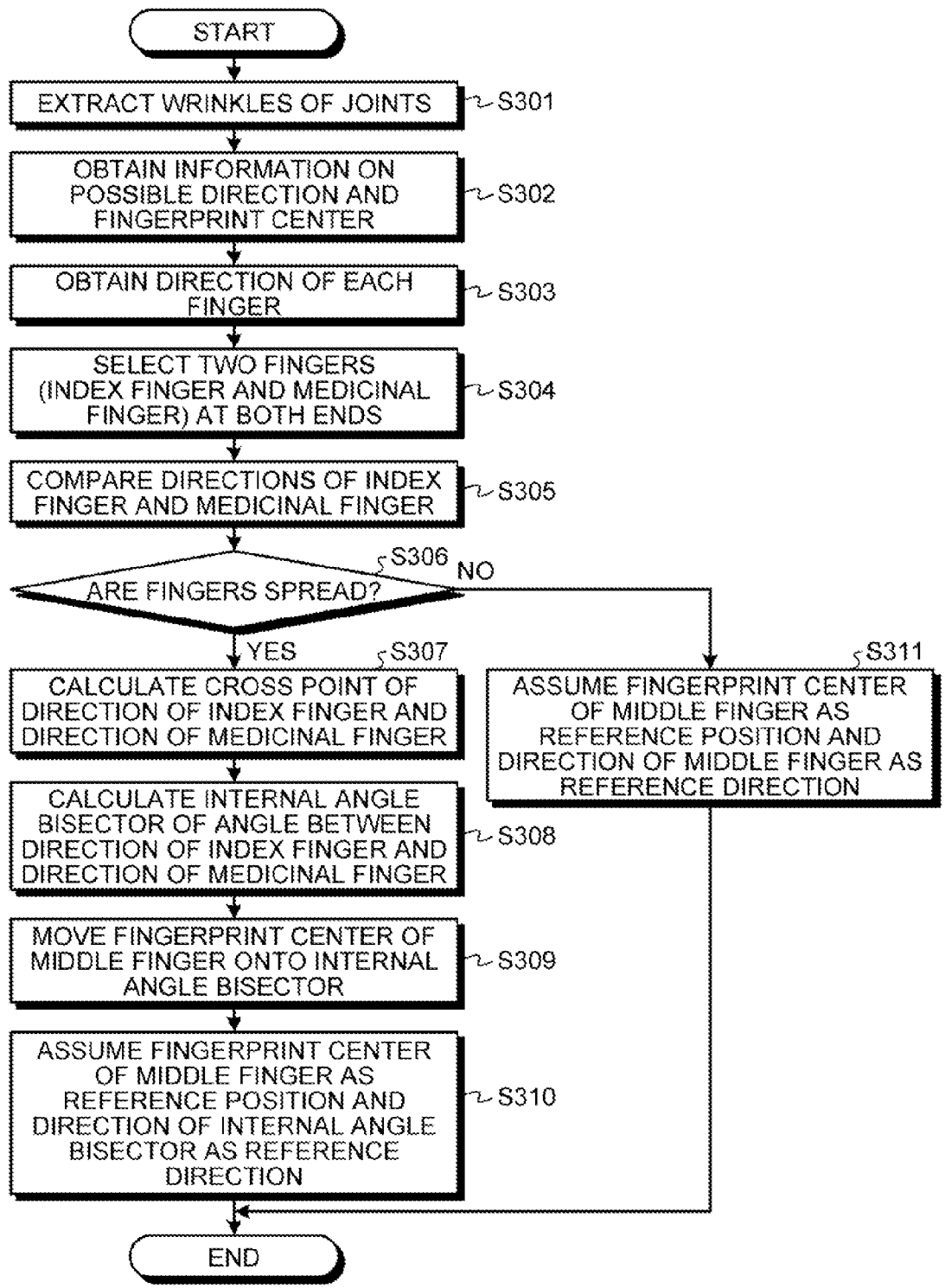
FIG. 8 is a flowchart of a reference calculation by the biometric authentication device according to the first embodiment.

A flow of the reference calculation by the biometric authentication device according to the present embodiment will be described below with reference to FIG. 8. FIG. 8 is a flowchart of the reference calculation by the biometric authentication device according to the first embodiment.

The finger direction detecting unit 21 is input with the fingerprint characteristic information on each finger from the fingerprint characteristic information extracting unit 2. Then, the finger direction detecting unit 21 extracts the wrinkles of the joint at the first joint of each finger (step S301).

Further, the finger direction detecting unit 21 obtains the information on the possible direction of the wrinkles of each finger and the fingerprint center of each finger (step S302).

Then, the finger direction detecting unit 21 takes a perpendicular from the fingerprint center to the possible direction of the wrinkles and obtains the direction of each finger (step S303).

The two-finger selecting unit 22 is input with the information on the direction of each finger and the information on the fingerprint center from the finger direction detecting unit 21. Then, the two-finger selecting unit 22 selects the index finger and the medicinal finger as the two fingers at both ends from the information on the direction of each finger and the fingerprint center (step S304).

The reference calculating unit 23 receives the information on the selected index finger and medicinal finger, the information on the direction of each finger, and the information on the fingerprint center of each finger from the two-finger selecting unit 22. Then, the reference calculating unit 23 compares the direction of the index finger with the direction of the medicinal finger (step S305).

Then, the reference calculating unit 23 determines whether the fingers are spread (step S306). When the fingers are spread (Yes in step S306), the reference calculating unit 23 calculates the cross point of the direction of the index finger and the direction of the medicinal finger (step S307).

Further, the reference calculating unit 23 calculates the internal angle bisector of the angle formed between the direction of the index finger and the direction of the medicinal direction (step S308).

Then, the reference calculating unit 23 rotates and moves the cross point of the direction of the index finger and the direction of the medicinal finger such that the fingerprint center of the middle finger matches with the internal angle bisector (step S309).

The reference calculating unit 23 assumes the fingerprint center of the rotated middle finger as the reference position, and the internal angle bisector of the angle formed between the index finger and the medicinal finger as the reference direction (step S310).

To the contrary, when the fingers are not spread (No in step S306), the reference calculating unit 23 assumes the fingerprint center of the middle finger as the reference position and the direction of the middle finger as the reference direction (step S311).

Hardware Structure

Figure 9:
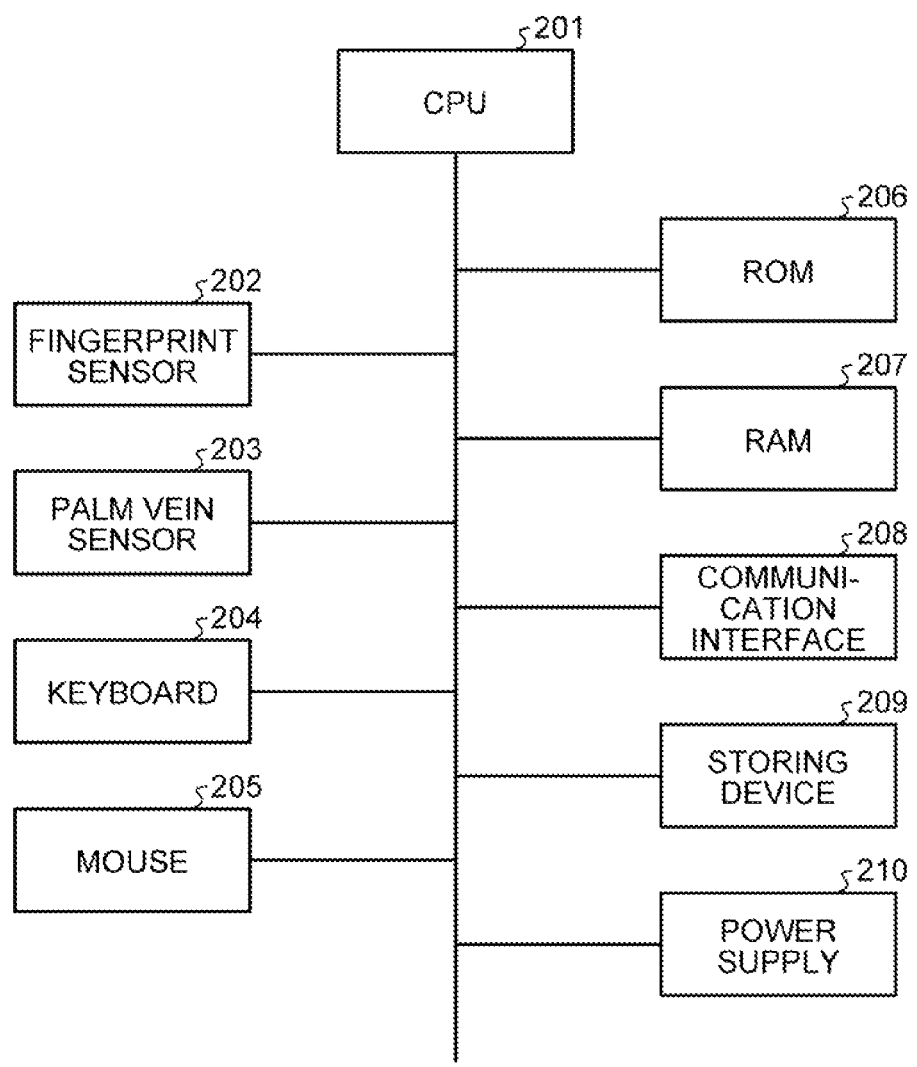
FIG. 9 is a hardware structure diagram of the biometric authentication device.

A hardware structure of the biometric authentication device will be described below. FIG. 9 is a hardware structure diagram of the biometric authentication device. As illustrated in FIG. 9, the biometric authentication device has a central processing unit (CPU) 201, a fingerprint sensor 202, a palm vein sensor 203, a keyboard 204 and a mouse 205. The biometric authentication device further has a read only memory (ROM) 206, a random access memory (RAM) 207, a communication interface 208, a storing device 209 and a power supply 210.

In the biometric authentication device, the CPU 201 is connected with the fingerprint sensor 202, the palm vein sensor 203, the keyboard 204, the mouse 205, the ROM 206, the RAM 207, the communication interface 208, the storing device 209 and the power supply 210.

The fingerprint sensor 202 achieves the functions of the fingerprint information inputting unit 11 and the fingerprint image obtaining unit 1 illustrated in FIG. 1. The palm vein sensor 203 achieves the functions of the vein information inputting unit 12 and the vein image obtaining unit 3 illustrated in FIG. 1. The storing device 209 achieves the function of the authentication information DB 6 illustrated in FIG. 1. The user may input information such as identification number other than the biometric information by use of the keyboard 204 and the mouse 205. Further, the communication interface 208 is used for the biometric authentication device to make communication with the outside. The power supply 210 supplies a power to each unit.

Then, the CPU 201, the ROM 206 and the RAM 207 achieve the functions of the fingerprint characteristic information extracting unit 2, the vein characteristic information extracting unit 4, the finger float detecting unit 5, the reference obtaining unit 20, the authenticating unit 30, the position correcting unit 40 and the like illustrated in FIG. 1, for example. For example, the ROM 206 stores therein various programs for achieving the processings by the fingerprint characteristic information extracting unit 2, the vein characteristic information extracting unit 4, the finger float detecting unit 5, the reference obtaining unit 20, the authenticating unit 30, the position correcting unit 40 and the like exemplified in FIG. 1. Then, the CPU 201 reads and executes various programs to generate a process for realizing each function described above.

As described above, the biometric authentication device according to the present embodiment can rotate the obtained image to match with the image on the enrollment in the direction and the position for verification. Thus, highly accurate verification can be executed when a palm or fingers are placed at any position, and thus the degree of freedom of how to place a palm or fingers is increased. Further, the fingers and the palm are placed at a proper position to enable the enrollment, thereby simply enrolling the biometric information.

The information on the three fingers is used to assume the internal angle bisector of the cross point of the directions of the fingers at both ends as the direction of the center finger, thereby absorbing the difference in the spread of the total fingers. Further, even when angles between the center finger and the fingers at both ends are not uniform, the fingerprint image of the center finger is rotated and moved onto the internal angle bisector of the cross point of the directions of the fingers at both ends, thereby recreating the uniform spread of the three fingers. Thus, even when the fingers are not uniformly spread, the positional alignment of the vein image can be easily performed. In other words, since the directions of the two fingers at both ends are used to define the reference direction, a direction with less deviation can be assumed as the reference, thereby enhancing the accuracy of the authentication.

The vein information on the authentication can be made closer to the vein information on the enrollment by only the rotating/moving and the parallel moving, thereby easily performing the positional alignment of the vein image.

First Modification

Figure 10:
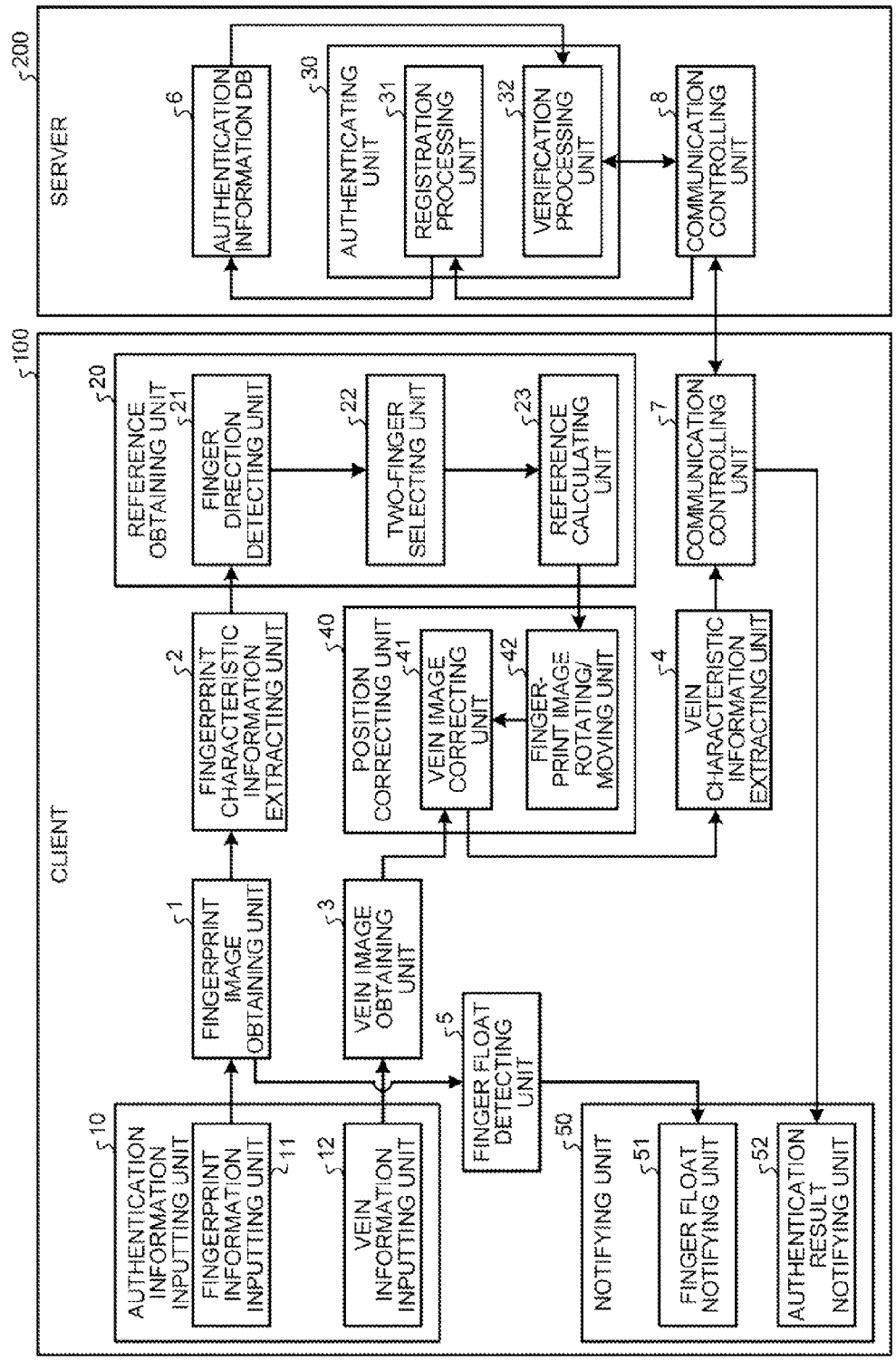
FIG. 10 is a block diagram of a biometric authentication system according to a first modification of the first embodiment.

A modification of the first embodiment will be described below. FIG. 10 is a block diagram of a biometric authentication system according to a first modification of the first embodiment.

The biometric authentication system according to the present modification is a client server system having a client 100 and a server 200 based on the biometric authentication device according to the first embodiment.

The client 100 has the fingerprint image obtaining unit 1, the fingerprint characteristic information extracting unit 2, the vein image obtaining unit 3, the vein characteristic information extracting unit 4, the finger float detecting unit 5, the authentication information inputting unit 10, the reference obtaining unit 20, the position correcting unit 40, the notifying unit 50 and a communication controlling unit 7. The server 200 has the authenticating unit 30, the authentication information DB 6 and a communication controlling unit 8. In FIG. 10, the respective units with the same reference numerals as those in FIG. 1 have the same functions unless otherwise stated.

The client 100 will be described. The vein image obtaining unit 3 outputs the palm vein image to the vein image correcting unit 41 both on the enrollment and on the authentication.

The reference calculating unit 23 outputs the reference direction and the reference position similarly to the first embodiment. Then, the reference calculating unit 23 outputs the reference direction and the reference position both on the enrollment and on the authentication to the fingerprint image rotating/moving unit 42.

The fingerprint image rotating/moving unit 42 previously stores a normalized reference direction and a normalized reference position. Herein, the normalized reference direction is a standard reference direction, and is set at 90° (right angle), for example. In addition, the normalized reference position is a standard reference position, and is set at a coordinate (50, 160), for example.

The fingerprint image rotating/moving unit 42 is input with the reference direction and the reference position from the reference calculating unit 23. Then, the fingerprint image rotating/moving unit 42 subtracts the reference direction found by the reference calculating unit 23 from the normalized reference direction both on the enrollment and on the authentication. Then, the fingerprint image rotating/moving unit 42 assumes a subtraction result as a rotation angle. Further, the fingerprint image rotating/moving unit 42 subtracts the reference position found by the reference calculating unit 23 from the normalized reference position. Then, the fingerprint image rotating/moving unit 42 assumes a subtraction result as a moving distance.

Then, the fingerprint image rotating/moving unit 42 outputs the found rotation angle and moving distance to the vein image correcting unit 41.

The vein image correcting unit 41 is input with the information on the reference position, the rotation angle and the moving distance from the fingerprint image rotating/moving unit 42. The vein image correcting unit 41 is input with the palm vein image from the vein image obtaining unit 3. Then, both on the enrollment and on the authentication, the vein image correcting unit 41 rotates the palm vein image by the rotation angle about the reference position of the received palm vein image and further moves it in parallel by the moving distance to correct the position of the palm vein image.

The vein image correcting unit 41 outputs the corrected palm vein image to the vein characteristic information extracting unit 4.

The vein characteristic information extracting unit 4 is input with the corrected palm vein image from the vein image correcting unit 41 both on the enrollment and on the authentication. Then, the vein characteristic information extracting unit 4 extracts the vein characteristic information from the received palm vein image. Then, the vein characteristic information extracting unit 4 outputs the vein characteristic information to the communication controlling unit 7.

The communication controlling unit 7 is connected with the communication controlling unit 8 of the server 200 via a network, for example. Then, the communication controlling unit 7 and the communication controlling unit 8 can exchange data with each other.

The communication controlling unit 7 is input with the vein characteristic information from the vein characteristic information extracting unit 4. Then, the communication controlling unit 7 transmits the vein characteristic information to the communication controlling unit 8. The communication controlling unit 7 receives an authentication result from the communication controlling unit 8. Then, the communication controlling unit 7 outputs the received authentication result to the authentication result notifying unit 52.

The server 200 will be described below. The communication controlling unit 8 receives the vein characteristic information from the communication controlling unit 7 of the client 100. Then, the communication controlling unit 8 outputs the received vein characteristic information to the enrollment processing unit 31 in the case of the enrollment processing. To the contrary, in the case of the authentication processing, the communication controlling unit 8 outputs the received vein characteristic information to the verification processing unit 32.

The enrollment processing unit 31 is input with the vein characteristic information from the communication controlling unit 8 in the case of the enrollment processing. Then, the enrollment processing unit 31 stores the received vein characteristic information in the authentication information DB 6.

The verification processing unit 32 is input with the vein characteristic information from the communication controlling unit 8 in the case of the authentication processing. Then, the verification processing unit 32 matches the received vein characteristic information with the vein characteristic information stored in the authentication information DB 6. Then, the verification processing unit 32 outputs a verification result to the communication controlling unit 8.

Figure 11:
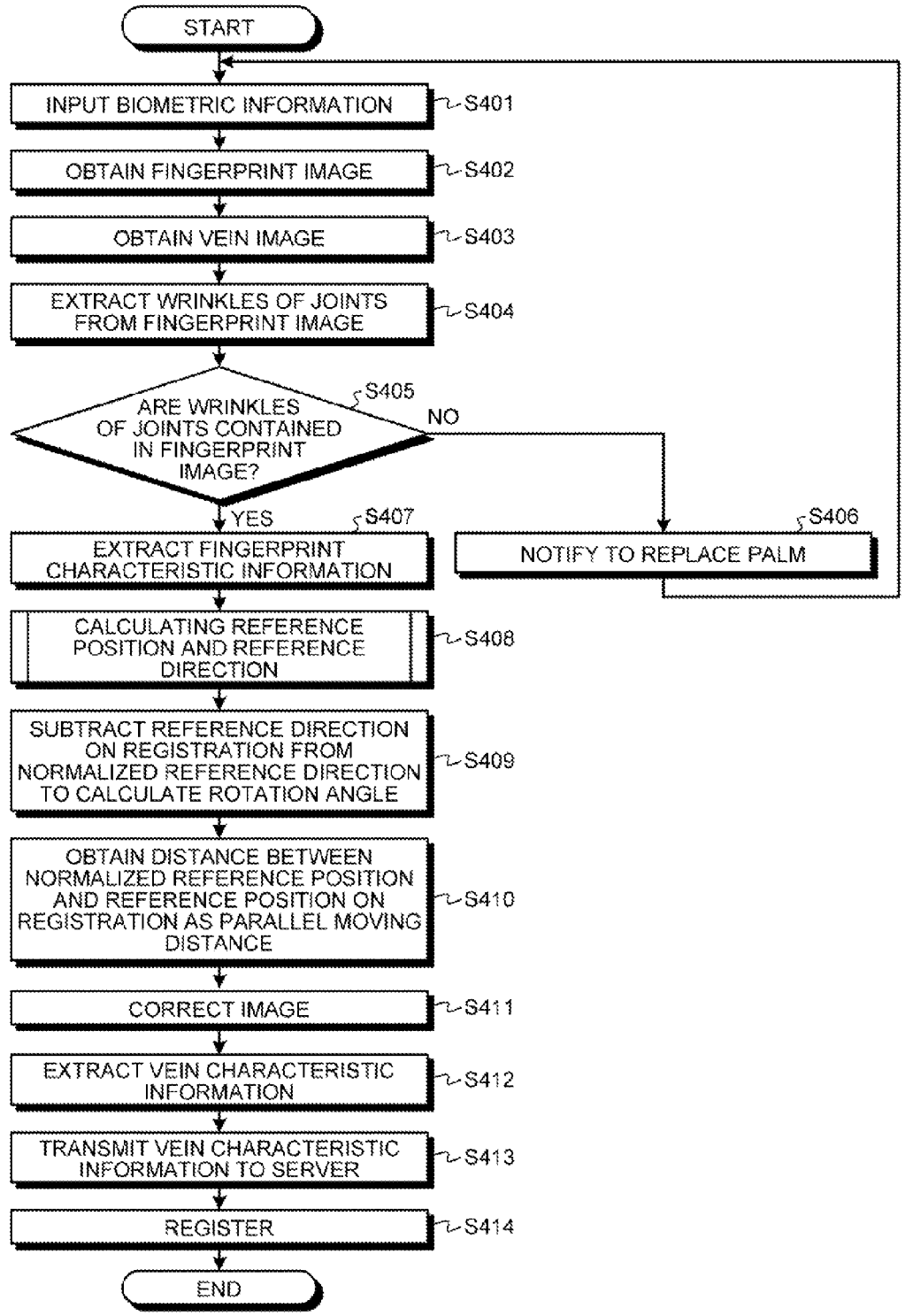
FIG. 11 is a flowchart of a enrollment processing in the biometric authentication system according to the first modification of the first embodiment.

A flow of the enrollment processing in the biometric authentication system according to the present modification will be described with reference to FIG. 11. FIG. 11 is a flowchart of the enrollment processing in the biometric authentication system according to the first modification of the first embodiment.

The user uses the authentication information inputting unit 10 to input the information on the fingerprints of the index finger, the middle finger and the medicinal finger and the information on the palm vein as the biometric information (step S401).

The fingerprint image obtaining unit 1 obtains the fingerprint image from the fingerprint information input from the fingerprint information inputting unit 11 (step S402).

The vein image obtaining unit 3 obtains the palm vein image from the palm vein information input from the vein information inputting unit 12 (step S403).

The finger float detecting unit 5 is input with the fingerprint image from the fingerprint image obtaining unit 1. Then, the finger float detecting unit 5 extracts the wrinkles of the joints from the fingerprint image (step S404).

The finger float detecting unit 5 determines whether the wrinkles of the joints are contained in the fingerprint image based on whether the wrinkles of the joints were able to be extracted (step S405). When the wrinkles of the joints are not contained (No in step S405), the finger float detecting unit 5 notifies that a finger is floating to the finger float notifying unit 51. The finger float notifying unit 51 receives the notification that a finger is floating from the finger float detecting unit 5. Then, the finger float notifying unit 51 notifies the user to replace the palm (step S406) and then returns to step S401.

To the contrary, when the wrinkles of the joints are contained (Yes in step S405), the fingerprint characteristic information extracting unit 2 is input with the fingerprint image from the fingerprint image obtaining unit 1. Then, the fingerprint characteristic information extracting unit 2 extracts the fingerprint characteristic information from the received fingerprint image (step S407).

The reference obtaining unit 20 is input with the fingerprint characteristic information from the fingerprint characteristic information extracting unit 2. Then, the reference obtaining unit 20 calculates the reference position and the reference direction from the received fingerprint characteristic information (step S408). Then, the reference obtaining unit 20 outputs the reference position and the reference direction on the enrollment to the fingerprint image rotating/moving unit 42.

The fingerprint image rotating/moving unit 42 subtracts the reference direction on the enrollment from the normalized reference direction to calculate a rotation angle (step S409).

Further, the fingerprint image rotating/moving unit 42 obtains distance between normalized reference position and reference position by subtracting the reference position on the enrollment from the normalized reference position to calculate a parallel moving distance (step S410).

The vein image correcting unit 41 is input with the information on the reference position, the rotation angle and the moving distance from the fingerprint image rotating/moving unit 42. Further, the vein image correcting unit 41 is input with the palm vein image from the vein image obtaining unit 3. Then, the vein image correcting unit 41 rotates the palm vein image by the rotation angle about the reference position of the received palm vein image and further moves it in parallel by the moving distance to correct the position of the palm vein image (step S411).

The vein characteristic information extracting unit 4 is input with the palm vein image from the vein image obtaining unit 3. Then, the vein characteristic information extracting unit 4 extracts the vein characteristic information from the received palm vein image (step S412).

The communication controlling unit 7 transmits the vein characteristic information extracted by the vein characteristic information extracting unit 4 to the server 200 (step S413).

The enrollment processing unit 31 of the server 200 receives the vein characteristic information from the communication controlling unit 8. Then, the enrollment processing unit 31 stores the vein characteristic information in the authentication information DB 6 and enrolls the biometric information of the user (step S414).

Figure 12:
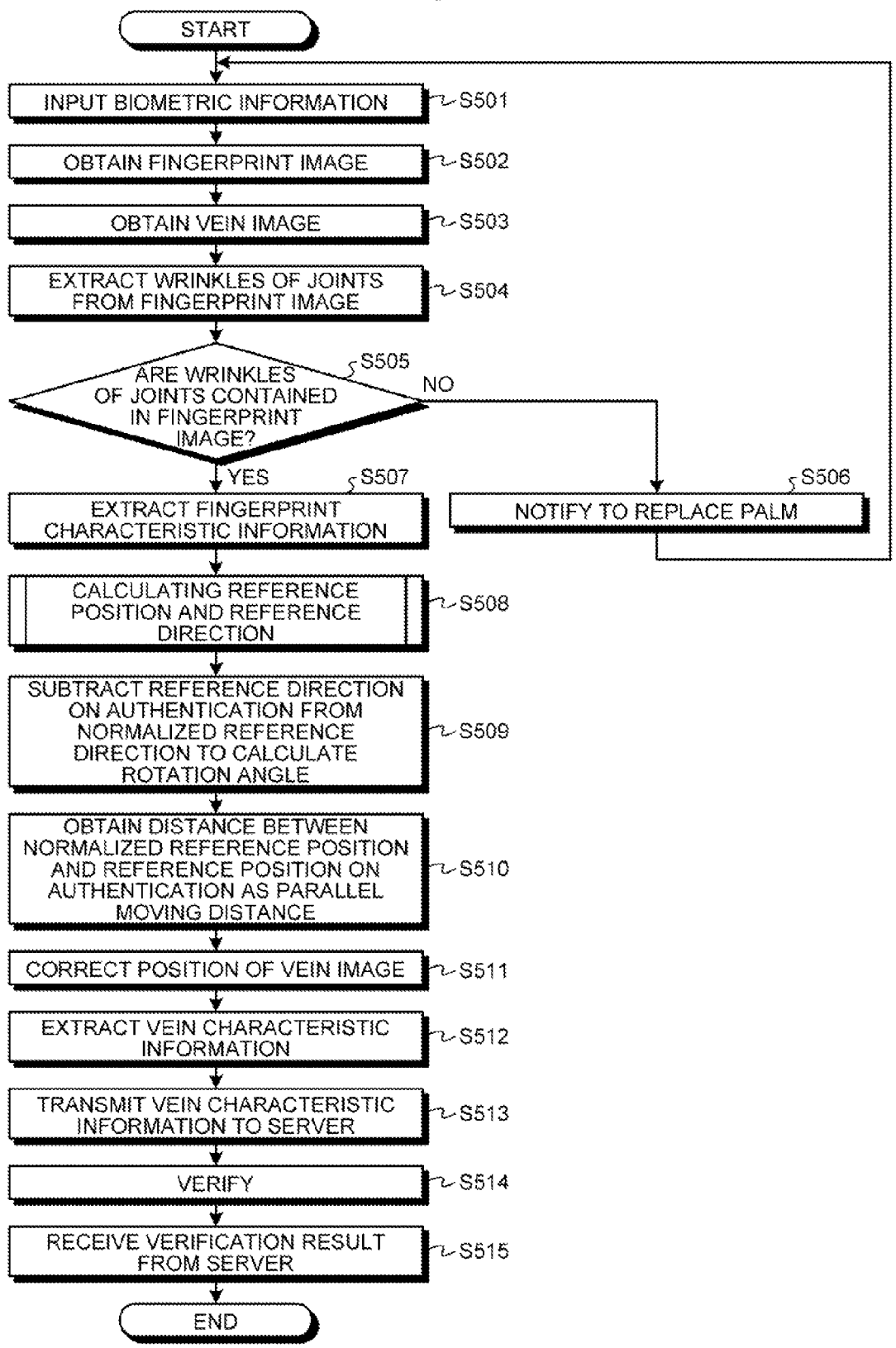
FIG. 12 is a flowchart of an authentication processing in the biometric authentication system according to the first modification of the first embodiment.

A flow of the authentication processing by the biometric authentication system according to the present modification will be described below with reference to FIG. 12. FIG. 12 is a flowchart of the authentication processing by the biometric authentication system according to the first modification of the first embodiment.

The user uses the authentication information inputting unit 10 to input the information on the fingerprints of the index finger, the middle finger and the medicinal finger and the information of the palm vein as the biometric information (step S501).

The fingerprint image obtaining unit 1 obtains the fingerprint image from the fingerprint information input from the fingerprint information inputting unit 11 (step S502).

The vein image obtaining unit 3 obtains the palm vein image from the palm vein information input from the vein information inputting unit 12 (step S503).

The finger float detecting unit 5 is input with the fingerprint image from the fingerprint image obtaining unit 1. Then, the finger float detecting unit 5 extracts the wrinkles of the joints from the fingerprint image (step S504).

The finger float detecting unit 5 determines whether the wrinkles of the joints are contained in the fingerprint image based on whether the wrinkles of the joints were able to be extracted (step S505). When the wrinkles of the joints are not contained (No in step S505), the finger float detecting unit 5 notifies that a finger is floating to the finger float notifying unit 51. The finger float notifying unit 51 receives the notification that a finger is floating from the finger float detecting unit 5. Then, the finger float notifying unit 51 notifies the user to replace the palm (step S506) and then returns to step S501.

To the contrary, when the wrinkles of the joints are contained (Yes in step S505), the fingerprint characteristic information extracting unit 2 is input with the fingerprint image from the fingerprint image obtaining unit 1. Then, the fingerprint characteristic information extracting unit 2 extracts the fingerprint characteristic information from the received fingerprint image (step S507).

The reference obtaining unit 20 is input with the fingerprint characteristic information from the fingerprint characteristic information extracting unit 2. Then, the reference obtaining unit 20 calculates the reference position and the reference direction from the received fingerprint characteristic information (step S508). Then, the reference obtaining unit 20 outputs the reference position and the reference direction on the authentication to the fingerprint image rotating/moving unit 42.

The fingerprint image rotating/moving unit 42 subtracts the reference direction on the authentication from the normalized reference direction to calculate a rotation angle (step S509).

Further, the fingerprint image rotating/moving unit 42 obtains distance between normalized reference position and reference position by subtracting the reference position on the authentication from the normalized reference position to calculate a parallel moving distance (step S510).

The vein image correcting unit 41 is input with the information on the reference position, the rotation angle and the moving distance from the fingerprint image rotating/moving unit 42. Further, the vein image correcting unit 41 is input with the palm vein image from the vein image obtaining unit 3. Then, the vein image correcting unit 41 rotates the palm vein image by the rotation angle about the reference position of the received palm vein image and moves it in parallel by the moving distance to correct the position of the palm vein image (step S511).

The vein characteristic information extracting unit 4 is input with the corrected palm vein image from the vein image correcting unit 41. Then, the vein characteristic information extracting unit 4 extracts the vein characteristic information from the received palm vein image (step S512).

The communication controlling unit 7 transmits the vein characteristic information extracted by the vein characteristic information extracting unit 4 to the server 200 (step S513).

The verification processing unit 32 receives the vein characteristic information from the communication controlling unit 8. Further, the verification processing unit 32 obtains the vein characteristic information from the authentication information DB 6. Then, the verification processing unit 32 matches the vein characteristic information on the authentication with the vein characteristic information on the enrollment (step S514).

The communication controlling unit 7 of the client 100 receives a verification result by the verification processing unit 32 from the communication controlling unit 8 of the server 200 (step S515).

As described above, the biometric authentication system according to the present modification can achieve the biometric authentication system having the same effects as the first embodiment in the structure of the client server system. Thus, the biometric authentication can be executed with multiple clients as terminals, and larger-scaled systems can be addressed.

There has been described in the present modification that the respective functions of the first embodiment are distributed in the two devices, but the present modification is not limited thereto and the respective functions of the first embodiment may be distributed in three or more devices.

Second Modification

Figure 13:
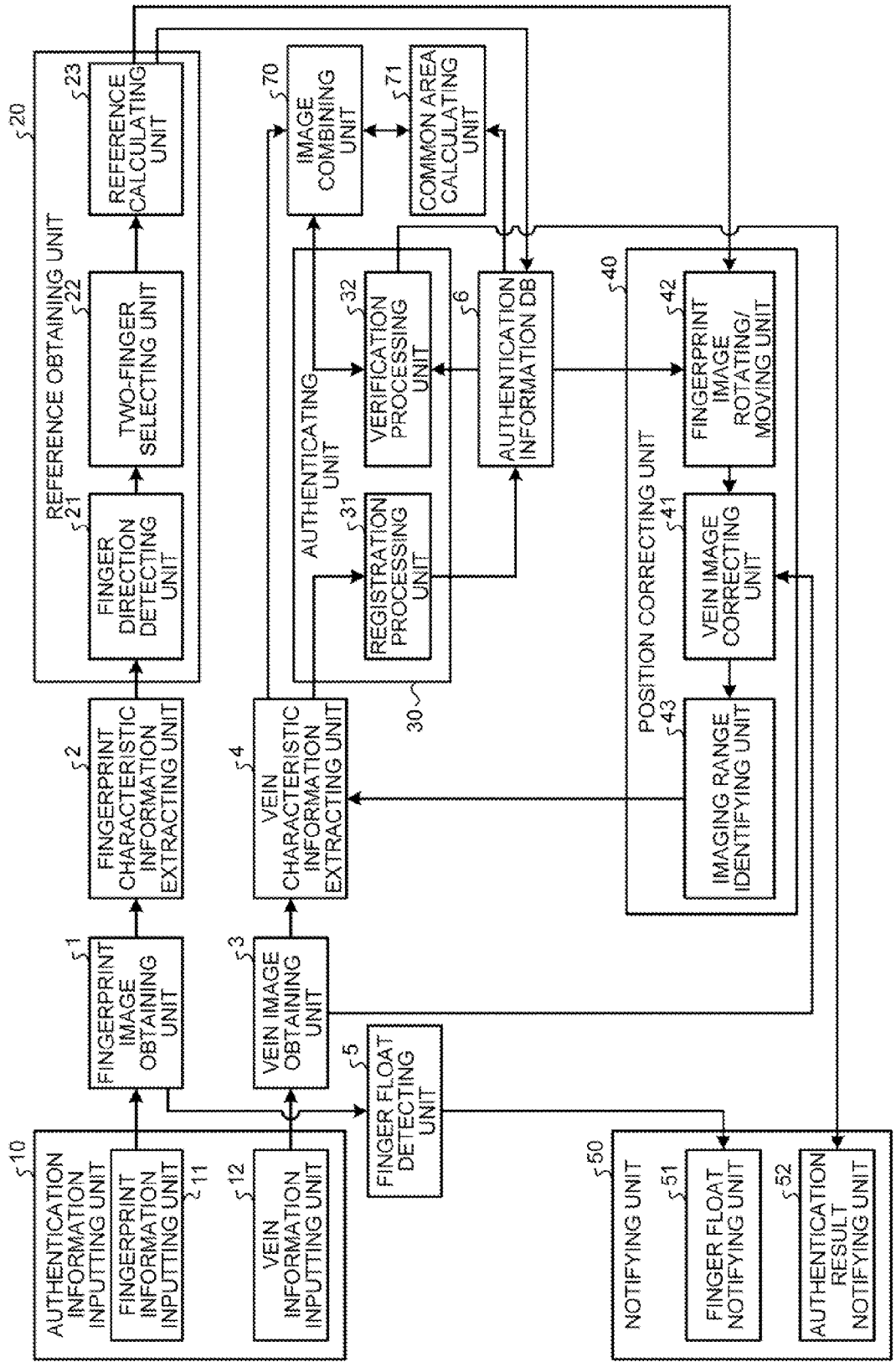
FIG. 13 is a block diagram of a biometric authentication device according to a second modification of the first embodiment.

Other modification of the first embodiment will be described below. FIG. 13 is a block diagram of a biometric authentication device according to a second modification of the first embodiment.

The biometric authentication device according to the present modification is different from the first embodiment in that a palm vein image is divided into blocks for authentication. The authentication using the block division will be mainly described below. In FIG. 13, the respective units with the same reference numerals as those in FIG. 1 have the same functions unless otherwise stated.

The biometric authentication device according to the present embodiment is such that an image combining unit 70, a common area calculating unit 71 and an imaging range identifying unit 43 in the position correcting unit 40 are provided in addition to the units of the first embodiment.

The vein image obtaining unit 3 divides the received palm vein image into predetermined blocks. For example, the vein image obtaining unit 3 divides the vein image into a 14×14 square and assumes each square as a block.

The vein characteristic information extracting unit 4 is input with the block-divided palm vein image from the vein image obtaining unit 3 in a case of the enrollment processing. Then, the vein characteristic information extracting unit 4 extracts the vein characteristic information from the block-divided palm vein image.

Further, the vein characteristic information extracting unit 4 is input with the corrected block-divided palm vein image from the imaging range identifying unit 43 in a case of the authentication processing. Then, the vein characteristic information extracting unit 4 extracts the vein characteristic information from the received block-divided palm vein image. Then, the vein characteristic information extracting unit 4 outputs the vein characteristic information to the image combining unit 70.

The enrollment processing unit 31 is input with the vein characteristic information and the position information of the blocks for which the vein characteristic information is obtained from the vein characteristic information extracting unit 4. Then, the enrollment processing unit 31 stores the received vein characteristic information and the position information on the blocks for which the vein characteristic information is obtained in the authentication information DB 6 in association with the reference direction and the reference position on the enrollment calculated by the reference calculating unit 23.

The imaging range identifying unit 43 previously stores an imaging range of the corrected palm vein image therein. The imaging range identifying unit 43 is input with the corrected block-divided palm vein image from the vein image correcting unit 41. Then, the imaging range identifying unit 43 deletes the blocks out of the imaging range due to the rotation and movement. Then, the imaging range identifying unit 43 outputs the block-divided palm vein image from which the blocks out of the imaging range are deleted to the vein characteristic information extracting unit 4.

When the authentication has been already performed on the user, the image combining unit 70 stores the vein characteristic information and the reference position used for the previous authentication of the user. Then, when storing the vein characteristic information used for the previous authentication of the user, the image combining unit 70 combines the vein characteristic information on the current authentication received from the vein characteristic information extracting unit 4 and the vein characteristic information on the previous authentication at the reference position. For example, the image combining unit 70 adds part of the vein characteristic information on the previous authentication out of the vein characteristic information on the current authentication to the vein characteristic information on the current authentication. Thus, even when the vein characteristic information on the current authentication is less, the authentication range can be enlarged for authentication so that the authentication is enabled to execute. Then, the image combining unit 70 outputs the number of blocks including the generated vein characteristic information to the common area calculating unit 71. To the contrary, when the vein characteristic information used on the previous authentication is not stored, the image combining unit 70 outputs the position information on the blocks including the vein characteristic information received from the vein characteristic information extracting unit 4 to the common area calculating unit 71.

Then, when being notified the notification that the authentication is to be continued from the common area calculating unit 71, the image combining unit 70 outputs the vein characteristic information on the current authentication received from the vein characteristic information extracting unit 4 to the verification processing unit 32. Further, when the verification processing unit 32 has successfully performed the authentication, the image combining unit 70 stores the vein characteristic information and the reference position at the current time as the vein characteristic information and the reference position on the authentication success. To the contrary, when the verification processing unit 32 has failed the authentication, the image combining unit 70 stores the vein characteristic information and the reference position at the previous time as the vein characteristic information and the reference position on the authentication success.

The common area calculating unit 71 receives the position information on the blocks including the vein characteristic information from the image combining unit 70. Further, the common area calculating unit 71 obtains the position information on the blocks including the vein characteristic information on the enrollment of the user from the authentication information DB 6. Then, when the number of blocks common between the blocks including the vein characteristic information on the enrollment and the blocks including the vein characteristic information on the authentication (which will be referred to as "common blocks" below) is a preset threshold or more, the common area calculating unit 71 determines that the area of the common part is enough. When determining that the area of the common part is enough, the common area calculating unit 71 notifies the image combining unit 70 of the authentication continuation. To the contrary, when determining that the area of the common part is not enough, the common area calculating unit 71 notifies the image combining unit 70 of the authentication cancellation. In this case, the processing is restarted from the inputting of the palm vein image.

The verification processing unit 32 receives the vein characteristic information from the image combining unit 70. Further, the verification processing unit 32 obtains the vein characteristic information on the enrollment from the authentication information DB 6. Then, the verification processing unit 32 matches the vein characteristic information received from the image combining unit 70 with the vein characteristic information on the enrollment obtained from the authentication information DB 6.

Figure 14:
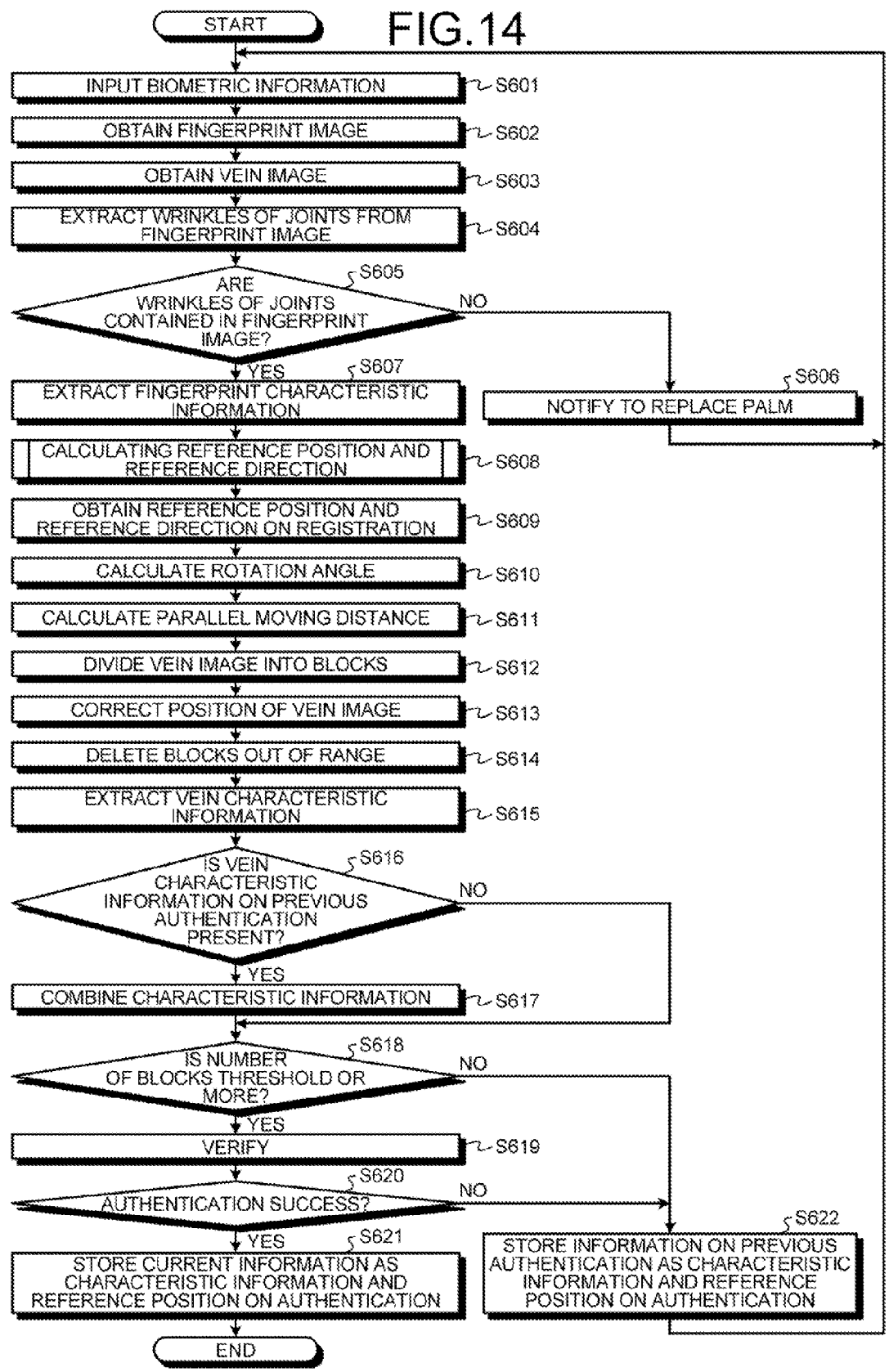
FIG. 14 is a flowchart of an authentication processing in the biometric authentication device according to the second modification of the first embodiment.

A flow of the authentication processing by the biometric authentication device according to the present modification will be described below with reference to FIG. 14. FIG. 14 is a flowchart of the authentication processing by the biometric authentication device according to the second modification of the first embodiment.

The user uses the authentication information inputting unit 10 to input the information on the fingerprints of the index finger, the middle finger and the medicinal finger and the information on the palm vein as the biometric information (step S601).

The fingerprint image obtaining unit 1 obtains the fingerprint image from the fingerprint information input from the fingerprint information inputting unit 11 (step S602).

The vein image obtaining unit 3 obtains the palm vein image from the palm vein information input from the vein information inputting unit 12 (step S603).

The finger float detecting unit 5 is input with the fingerprint image from the fingerprint image obtaining unit 1. Then, the finger float detecting unit 5 extracts the wrinkles of the joints from the fingerprint image (step S604).

The finger float detecting unit 5 determines whether the wrinkles of the joints are contained in the fingerprint image based on whether the wrinkles of the joints were able to be extracted (step S605). When the wrinkles of the joints are not contained (No in step S605), the finger float detecting unit 5 notifies that a finger is floating to the finger float notifying unit 51. The finger float notifying unit 51 receives the notification that a finger is floating from the finger float detecting unit 5. Then, the finger float notifying unit 51 notifies the user to replace the palm (step S606) and then returns to step S601.

To the contrary, when the wrinkles of the joints are contained (Yes in step S605), the fingerprint characteristic information extracting unit 2 is input with the fingerprint image from the fingerprint image obtaining unit 1. Then, the fingerprint characteristic information extracting unit 2 extracts the fingerprint characteristic information from the received fingerprint image (step S607).

The reference obtaining unit 20 is input with the fingerprint characteristic information from the fingerprint characteristic information extracting unit 2. Then, the reference obtaining unit 20 calculates the reference position and the reference direction from the received fingerprint characteristic information (step S608). Then, the reference obtaining unit 20 outputs the reference position and the reference direction on the authentication to the fingerprint image rotating/moving unit 42.

The fingerprint image rotating/moving unit 42 obtains the reference direction and the reference position on the enrollment from the authentication information DB 6 (step S609).

Then, the fingerprint image rotating/moving unit 42 calculates an angle formed between the reference direction on the enrollment and the reference direction on the authentication as a rotation angle (step S610).

Then, the fingerprint image rotating/moving unit 42 calculates a distance between the reference position on the enrollment and the reference position on the authentication as a parallel moving distance (step S611).

The vein image obtaining unit 3 divides the obtained palm vein image into blocks (step S612). The block division is performed here in the flow of FIG. 14 for convenience of the explanation, but the block division may be performed anywhere before step S611.

The vein image correcting unit 41 is input with the block-divided palm vein image from the vein image obtaining unit 3. Further, the vein image correcting unit 41 is input with the reference position on the authentication, the rotation angle and the parallel moving distance from the fingerprint image rotating/moving unit 42. Then, the vein image correcting unit 41 rotates the palm vein image by the rotation angle about the reference position of the received palm vein image and moves it in parallel by the moving distance to correct the position of the palm vein image (step S613).

The imaging range identifying unit 43 deletes the blocks out of the imaging range from the palm vein image received from the vein image correcting unit 41 (step S614).

The vein characteristic information extracting unit 4 is input with the corrected palm vein image from the imaging range identifying unit 43. Then, the vein characteristic information extracting unit 4 extracts the vein characteristic information from the received palm vein image (step S615).

The image combining unit 70 determines whether the vein characteristic information on the previous authentication is present (step S616). When the vein characteristic information on the previous authentication is present (Yes in step S616), the image combining unit 70 combines the vein characteristic information at the current time with the vein characteristic information on the previous authentication (step S617). When determining that the vein characteristic information on the previous authentication is not present (No in step S616), the image combining unit 70 proceeds to step S618.

The common area calculating unit 71 determines whether the number of common blocks is the threshold or more (step S618). When the number is the threshold or more (Yes in step S618), the verification processing unit 32 receives the vein characteristic information from the image combining unit 70. Further, the verification processing unit 32 obtains the vein characteristic information on the enrollment from the authentication information DB 6. Then, the verification processing unit 32 matches the vein characteristic information received from the image combining unit 70 with the vein characteristic information on the enrollment (step S619).

The verification processing unit 32 determines success and failure of the authentication (step S620). When the authentication has been successfully performed (Yes in step S620), the verification processing unit 32 notifies the authentication success to the authentication result notifying unit 52. Then, the image combining unit 70 stores the vein characteristic information at the current time and the reference position as the vein characteristic information on the authentication success (step S621).

To the contrary, when the authentication has failed (No in step S620) and when the number of blocks lowers the threshold (No in step S618), the image combining unit 70 stores the vein characteristic information at the previous time and the reference position as the vein characteristic information on the authentication success and the reference information (step S622). Then, the verification processing unit 32 notifies the user of the authentication failure.

FIG. 15 is a diagram for explaining the authentication using the block division. A region 301 illustrated in FIG. 5 is an imaging range of the fingerprint image. In addition, a region 302 is an imaging range of the palm vein image. The right diagram in FIG. 15 relative to the sheet indicates the state on the authentication and the left diagram relative to the sheet indicates the state on the enrollment. A circle 303 indicates characteristic information. In addition, blocks 305 include the characteristic information on the authentication. Further, blocks 304 include the characteristic information on the enrollment.

The palm vein image on the authentication on the right relative to the sheet is rotated and moved in parallel such that a reference position 307 matches with the reference position on the enrollment. Thus, the blocks 305 including the characteristic information on the authentication are moved to blocks 306. No blocks 306 are out of the region 302 and thus are deleted. Then, the blocks common between the blocks 304 and the blocks 306 are the common blocks, and when the number of common blocks is the threshold or more, the characteristic information included in the blocks 304 is matched with the characteristic information included in the blocks 306.

Figure 16:
FIG. 16 is a diagram for explaining exemplary division blocks and common blocks.

Further, FIG. 16 is a diagram illustrating exemplary division blocks and common blocks. A table 310 indicates the division blocks and the common blocks in the state of FIG. 15. For example, as depicted in the table 310, the table indicates that the division blocks in FIG. 15 are the 14×14 square. As depicted in the table 310, the common blocks between the blocks 304 and the blocks 306 in FIG. 15 are 10. In this way, the division blocks are determined and the common blocks are found.

As described above, the biometric authentication device according to the present modification can perform the authentication on other than the vein characteristic information out of the imaging range. Thus, unnecessary vein characteristic information does not need to be verified, thereby reducing loads on the processings of the biometric authentication device.

[b] Second Embodiment

Figure 17:
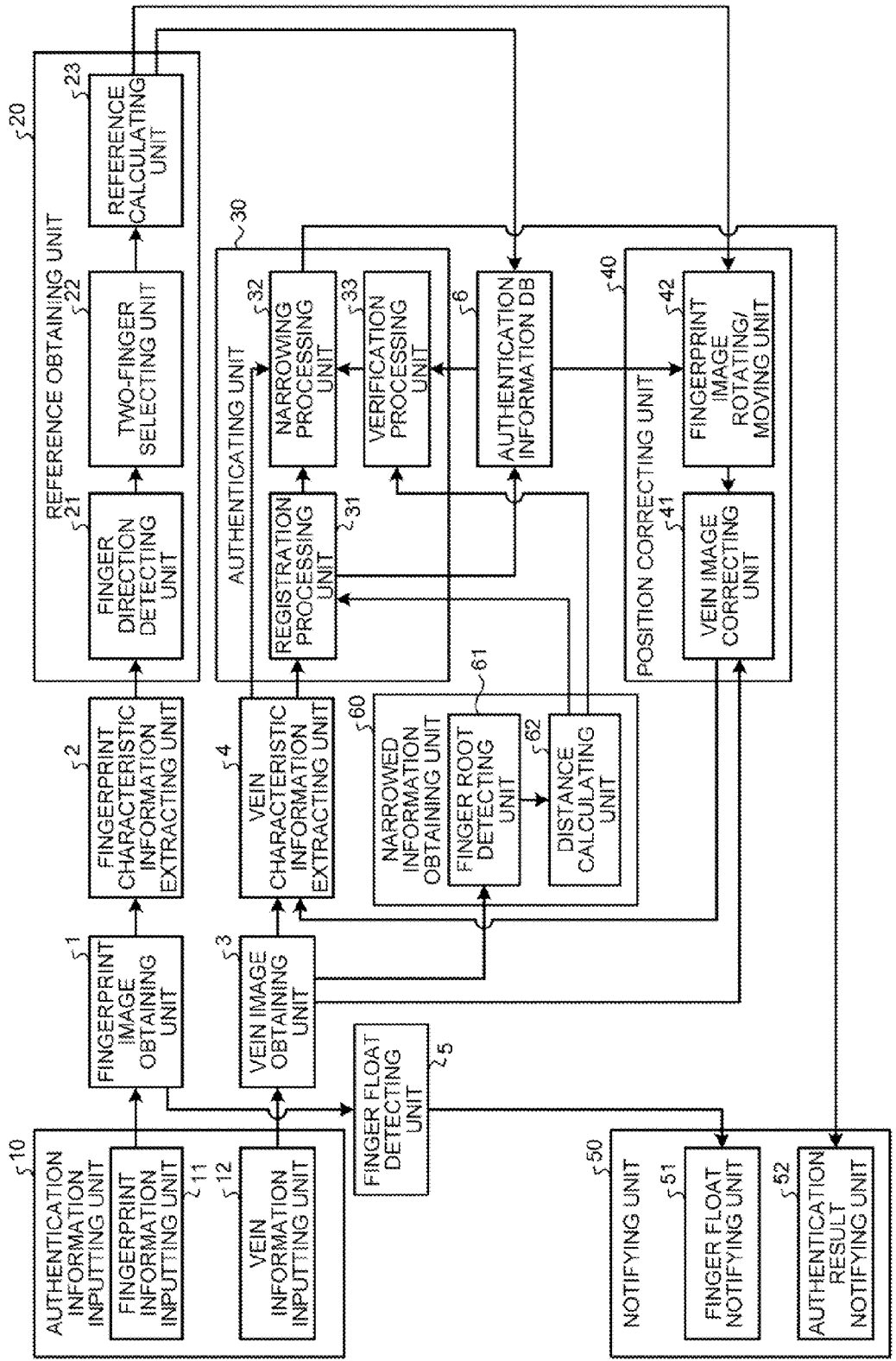
FIG. 17 is a block diagram of a biometric authentication device according to a second embodiment.

FIG. 17 is a block diagram of a second embodiment. A biometric authentication device according to the present embodiment is different from the first embodiment in that the vein characteristic information on the enrollment is narrowed before the authentication. How the vein characteristic information on the enrollment is narrowed will be mainly described below. In FIG. 17, the respective units with the same reference numerals as those in FIG. 1 have the same functions unless otherwise stated.

The biometric authentication device according to the present embodiment is such that a narrowed information obtaining unit 60 and a narrowing processing unit 33 in the authenticating unit 30 are provided in addition to the respective units of the first embodiment.

The narrowed information obtaining unit 60 has a base of finger detecting unit 61 and a distance calculating unit 62.

Figure 18:
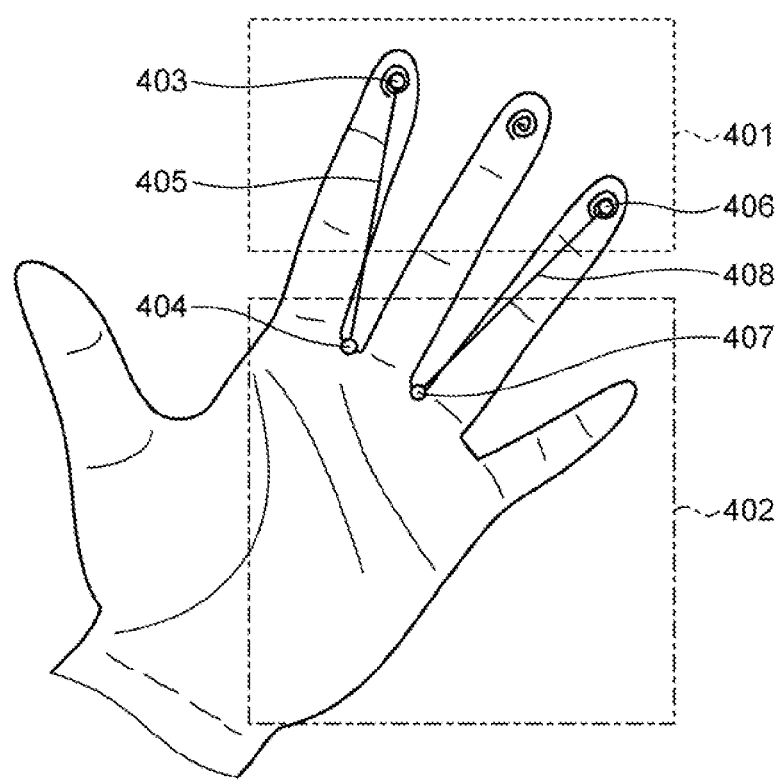
FIG. 18 is a diagram for explaining how to calculate a distance between the fingerprint and the base of finger.

FIG. 18 is a diagram for explaining how to calculate a distance between the fingerprint and the base of finger. A region 401 in FIG. 18 is an imaging region of the fingerprint image, and a region 402 is an imaging region of the palm vein image.

The base of finger detecting unit 61 is input with the palm vein image from the vein image obtaining unit 3 both on the enrollment and on the authentication. Then, the base of finger detecting unit 61 obtains the root positions between the fingers at both ends and the center finger. In the present embodiment, the base of finger detecting unit 61 obtains a root position 404 between the index finger and the middle finger, and a root position 407 between the medicinal finger and the middle finger illustrated in FIG. 18. Then, the base of finger detecting unit 61 outputs information on the root positions between the fingers to the distance calculating unit 62.

The distance calculating unit 62 is input with the information on the root positions between the fingers from the base of finger detecting unit 61. Then, the distance calculating unit 62 obtains the fingerprint centers of the fingers at both ends. In the present embodiment, the distance calculating unit 62 obtains a fingerprint center 403 of the index finger and a fingerprint center 406 of the medicinal finger. Then, the distance calculating unit 62 finds distances from the fingerprint centers of the fingers at both ends to the root positions between the fingers at both ends and the center finger. In the present embodiment, the distance calculating unit 62 finds a distance 405 between the fingerprint center 403 and the root position 404 and a distance 408 between the fingerprint center 406 and the root position 407 in FIG. 18. The distance calculating unit 62 outputs the found distances from the fingerprint centers of the fingers at both ends to the root positions between the fingers at both ends and the center finger to the enrollment processing unit 31 in the case of the enrollment processing. In the authentication processing, the distance calculating unit 62 outputs the distances between the fingerprint centers of the fingers at both ends to the root positions between the fingers at both ends and the center finger to the narrowing processing unit 33.

The enrollment processing unit 31 stores the vein characteristic information received from the vein characteristic information extracting unit 4 and the distances from the fingerprint centers of the fingers at both ends to the root positions between the fingers at both ends and the center finger received from the distance calculating unit 62 in the authentication information DB 6 in an associated manner. Also in this case, the enrollment processing unit 31 stores the vein characteristic information in the authentication information DB 6 in association with the reference position and the reference information.

The narrowing processing unit 33 is input with the distances from the fingerprint centers of the fingers at both ends to the root positions between the fingers at both ends and the center finger from the distance calculating unit 62. Then, the narrowing processing unit 33 extracts the vein characteristic information having a distance within a predetermined range relative to the received distances from the fingerprint centers of the fingers at both ends to the root positions between the fingers at both ends and the center finger from the authentication information DB 6. Then, the narrowing processing unit 33 outputs the extracted vein characteristic information to the verification processing unit 32.

The verification processing unit 32 is input with the vein characteristic information extracted by the narrowing processing unit 33. Further, the verification processing unit 32 is input with the vein characteristic information used for the current authentication from the vein characteristic information extracting unit 4. Then, the verification processing unit 32 matches the vein characteristic information used on the current authentication with the vein characteristic information extracted by the narrowing processing unit 33.

Figure 19:
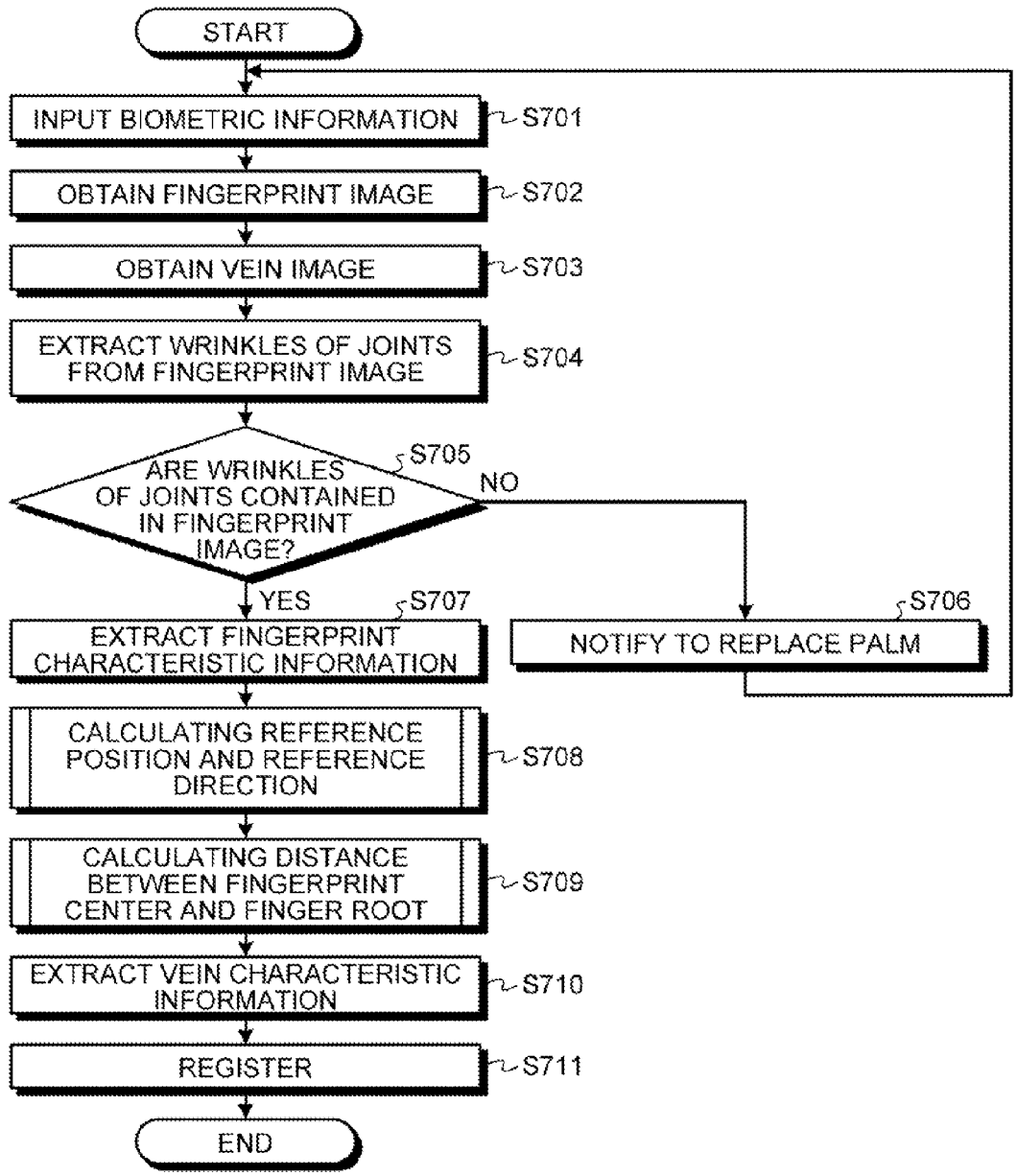
FIG. 19 is a flowchart of a enrollment processing in the biometric authentication device according to the second embodiment.

A flow of the enrollment processing by the biometric authentication device according to the present embodiment will be described below with reference to FIG. 19. FIG. 19 is a flowchart of the enrollment processing by a biometric authentication processing according to the second embodiment.

The user uses the authentication information inputting unit 10 to input the information on the fingerprints of the index finger, the middle finger and the medicinal finger and the information on the palm vein as the biometric information (step S701).

The fingerprint image obtaining unit 1 obtains the fingerprint image from the fingerprint information input from the fingerprint information inputting unit 11 (step S702).

The vein image obtaining unit 3 obtains the palm vein image from the palm vein information input from the vein information inputting unit 12 (step S703).

The finger float detecting unit 5 is input with the fingerprint image from the fingerprint image obtaining unit 1. Then, the finger float detecting unit 5 extracts the wrinkles of the joints from the fingerprint image (step S704).

The finger float detecting unit 5 determines whether the wrinkles of the joint are contained in the fingerprint image based on whether the wrinkles of the joint were able to be extracted (step S705). When the wrinkles of the joints are not contained (No in step S705), the finger float detecting unit 5 notifies that a finger is floating to the finger float notifying unit 51. The finger float notifying unit 51 receives the notification that a finger is floating from the finger float detecting unit 5. Then, the finger float notifying unit 51 notifies the user to replace the palm (step S706) and then returns to step S701.

To the contrary, when the wrinkles of the joints are contained (Yes in step S705), the fingerprint characteristic information extracting unit 2 is input with the fingerprint image from the fingerprint image obtaining unit 1. Then, the fingerprint characteristic information extracting unit 2 extracts the fingerprint characteristic information from the received fingerprint image (step S707).

The reference obtaining unit 20 is input with the fingerprint characteristic information from the fingerprint characteristic information extracting unit 2. Then, the reference obtaining unit 20 calculates the reference position and the reference direction from the received fingerprint characteristic information (step S708). Then, the reference obtaining unit 20 outputs the reference position and the reference direction on the enrollment to the authentication information DB 6.

The narrowed information obtaining unit 60 calculates the distance between the fingerprint center and the base of finger (step S709).

The vein characteristic information extracting unit 4 is input with the palm vein image from the vein image obtaining unit 3. Then, the vein characteristic information extracting unit 4 extracts the vein characteristic information from the received palm vein image (step S710).

The enrollment processing unit 31 receives the vein characteristic information from the vein characteristic information extracting unit 4. Further, the enrollment processing unit 31 is input with the distance from the fingerprint center to the base of finger from the narrowed information obtaining unit 60. Then, the enrollment processing unit 31 stores the distance between the fingerprint center and the base of finger and the vein characteristic information in the authentication information DB 6 in association with the reference position and the reference direction, and enrolls the biometric information of the user (step S711).

Figure 20:
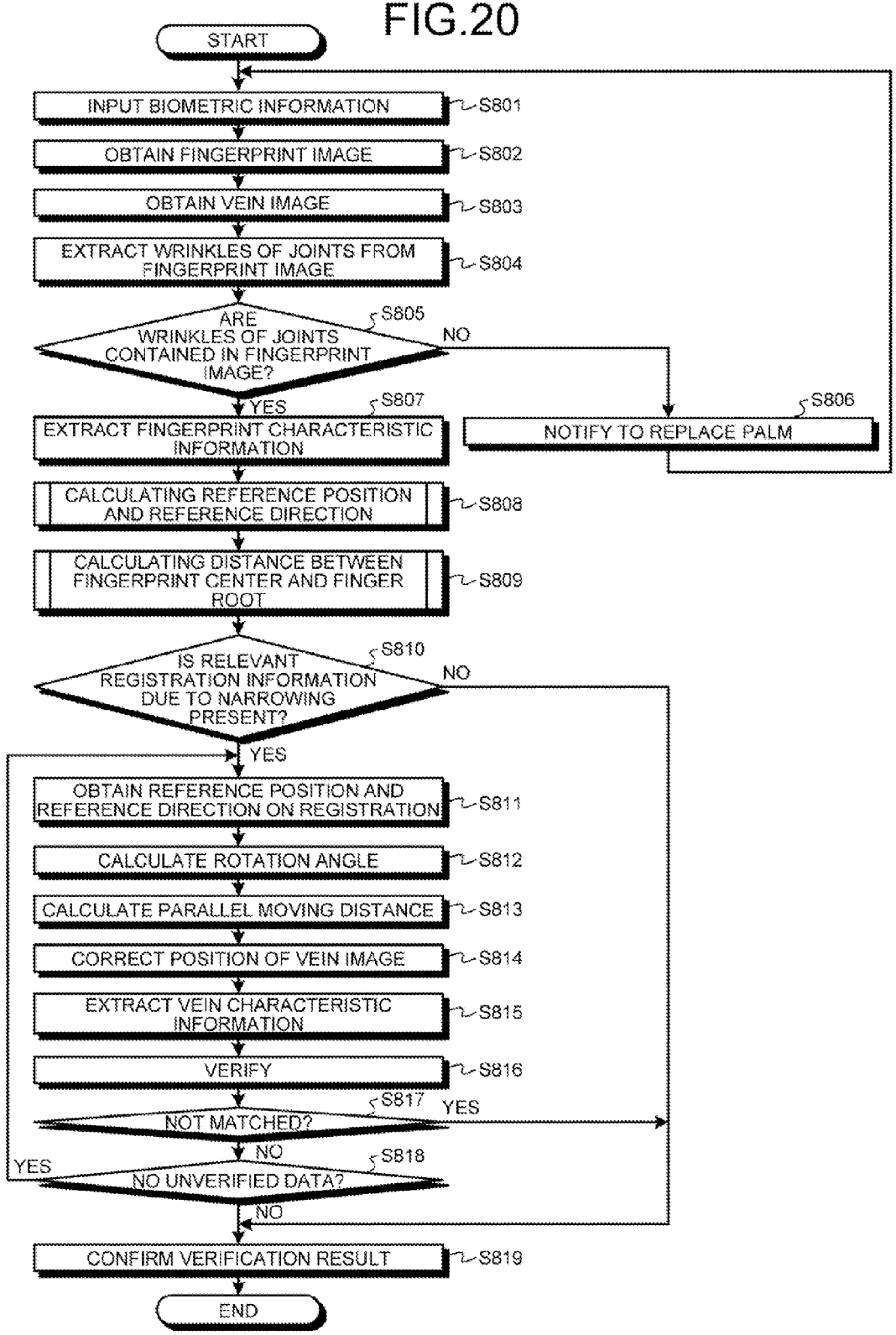
FIG. 20 is a flowchart of an authentication processing in the biometric authentication device according to the second embodiment.

A flow of the authentication processing by the biometric authentication device according to the present embodiment will be described below with reference to FIG. 20. FIG. 20 is a flowchart of the authentication processing by the biometric authentication device according to the second embodiment.

The user uses the authentication information inputting unit 10 to input the information on the fingerprints of the index finger, the middle finger and the medicinal finger and the information on the palm vein as the biometric information (step S801).

The fingerprint image obtaining unit 1 obtains the fingerprint image from the fingerprint information input from the fingerprint information inputting unit 11 (step S802).

The vein image obtaining unit 3 obtains the palm vein image from the palm vein information input from the vein information inputting unit 12 (step S803).

The finger float detecting unit 5 is input with the fingerprint image from the fingerprint image obtaining unit 1. Then, the finger float detecting unit 5 extracts the wrinkles of the joints from the fingerprint image (step S804).

The finger float detecting unit 5 determines whether the wrinkles of the joints are contained in the fingerprint image based on whether the wrinkles of the joints were able to be extracted (step S805). When the wrinkles of the joints are not contained (No in step S805), the finger float detecting unit 5 notifies that a finger is floating to the finger float notifying unit 51. The finger float notifying unit 51 receives the notification that a finger is floating from the finger float detecting unit 5. Then, the finger float notifying unit 51 notifies the user to replace the palm (step S806) and then returns to step S801.

To the contrary, when the wrinkles of the joints are contained (Yes in step S805), the fingerprint characteristic information extracting unit 2 is input with the fingerprint image from the fingerprint image obtaining unit 1. Then, the fingerprint characteristic information extracting unit 2 extracts the fingerprint characteristic information from the received fingerprint image (step S807).

The reference obtaining unit 20 is input with the fingerprint characteristic information from the fingerprint characteristic information extracting unit 2. Then, the reference obtaining unit 20 calculates the reference position and the reference direction from the received fingerprint characteristic information (step S808). Then, the reference obtaining unit 20 outputs the reference position and the reference direction on the authentication to the fingerprint image rotating/moving unit 42.

The narrowed information obtaining unit 60 calculates the distance from the fingerprint center to the base of finger (step S809).

The narrowing processing unit 33 determines whether the relevant enrollment information to be narrowed is present (step S810). When the relevant enrollment information to be narrowed is present (Yes in step S810), the fingerprint image rotating/moving unit 42 obtains the reference direction and the reference position on the enrollment from the authentication information DB 6 (step S811).

Then, the fingerprint image rotating/moving unit 42 calculates an angle formed between the reference direction on the enrollment and the reference direction on the authentication as a rotation angle (step S812).

Then, the fingerprint image rotating/moving unit 42 calculates a distance between the reference position on the enrollment and the reference position on the authentication as a parallel moving distance (step S813).

The vein image correcting unit 41 is input with the palm vein image from the vein image obtaining unit 3. Further, the vein image correcting unit 41 is input with the reference position on the authentication, the rotation angle and the parallel moving distance from the fingerprint image rotating/moving unit 42. The vein image correcting unit 41 rotates the palm vein image by the rotation angle about the reference position of the received palm vein image and moves it in parallel by the moving distance to correct the position of the palm vein image (step S814).

The vein characteristic information extracting unit 4 is input with the corrected palm vein image from the vein image correcting unit 41. Then, the vein characteristic information extracting unit 4 extracts the vein characteristic information from the received palm vein image (step S815).

The verification processing unit 32 receives the vein characteristic information from the vein characteristic information extracting unit 4. Further, the verification processing unit 32 obtains the vein characteristic information on the enrollment from the narrowing processing unit 33. Then, the verification processing unit 32 matches the vein characteristic information on the authentication with the vein characteristic information on the enrollment (step S816). The verification processing unit 32 determines whether the vein characteristic information on the authentication matches with the vein characteristic information on the enrollment (step S817). When determining that the two match (Yes in step S817), the verification processing unit 32 proceeds to step S819. When the two do not match (No in step S817), the verification processing unit 32 determines whether unverified data is present. When determining that unverified data is not present (No in step S818), the verification processing unit 32 proceeds to step S819.

To the contrary, when determining that unverified data is present (Yes in step S818), the verification processing unit 32 proceeds to step S811.

Then, in No in step S817 or Yes in step S818, the verification processing unit 32 confirms the verification result (step S819). When unverified data is not present and when matched data is not present, the verification result may be confirmed by verifying the most similar data. Then, the verification processing unit 32 notifies success and failure of the authentication to the authentication result notifying unit 52. Then, the authentication result notifying unit 52 notifies the user of the authentication result.

Figure 21:
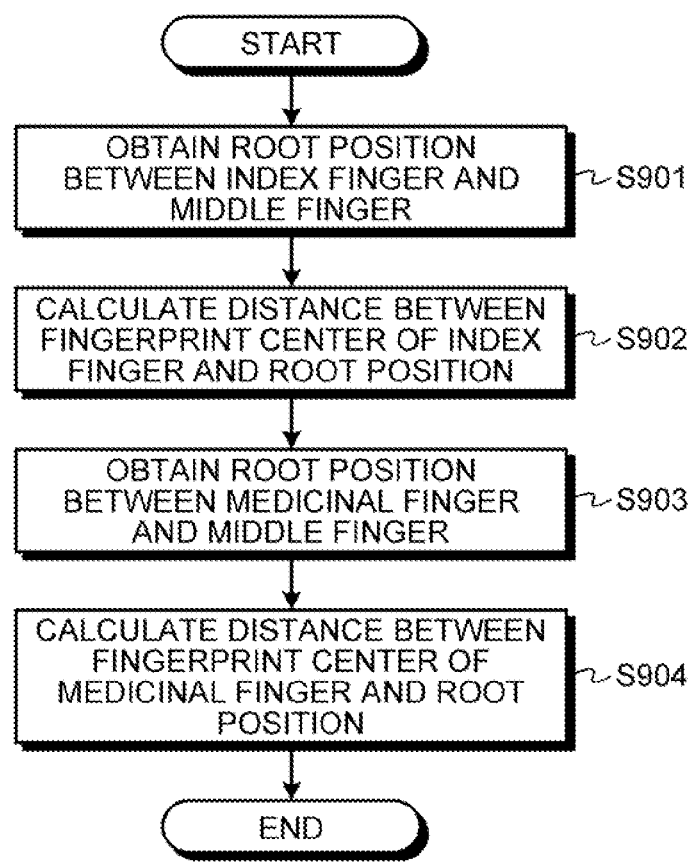
FIG. 21 is a flowchart of a narrowing processing in the biometric authentication device according to the second embodiment.

A flow of the narrowing processing by the biometric authentication device according to the present embodiment will be described below with reference to FIG. 21. FIG. 21 is a flowchart of the narrowing processing by the biometric authentication device according to the second embodiment.

The base of finger detecting unit 61 obtains the root position between the index finger and the middle finger (step S901).

The distance calculating unit 62 finds a fingerprint center of the index finger. Then, the distance calculating unit 62 calculates a distance from the fingerprint center of the index finger to the root position between the index finger and the middle finger detected by the base of finger detecting unit 61 (step S902).

The base of finger detecting unit 61 obtains the root position between the medicinal finger and the middle finger (step S903).

The distance calculating unit 62 finds a fingerprint center of the medicinal finger. Then, the distance calculating unit 62 calculates a distance from the fingerprint center of the medicinal finger to the root position between the medicinal finger and the middle finger detected by the base of finger detecting unit 61 (step S904).

As described above, the biometric authentication device according to the present modification can narrow the vein characteristic information for authentication. Thus, unnecessary vein characteristic information does not need to be verified, thereby reducing loads on the processings of the biometric authentication device and speeding up the processings.

[c] Third Embodiment

Figure 22:
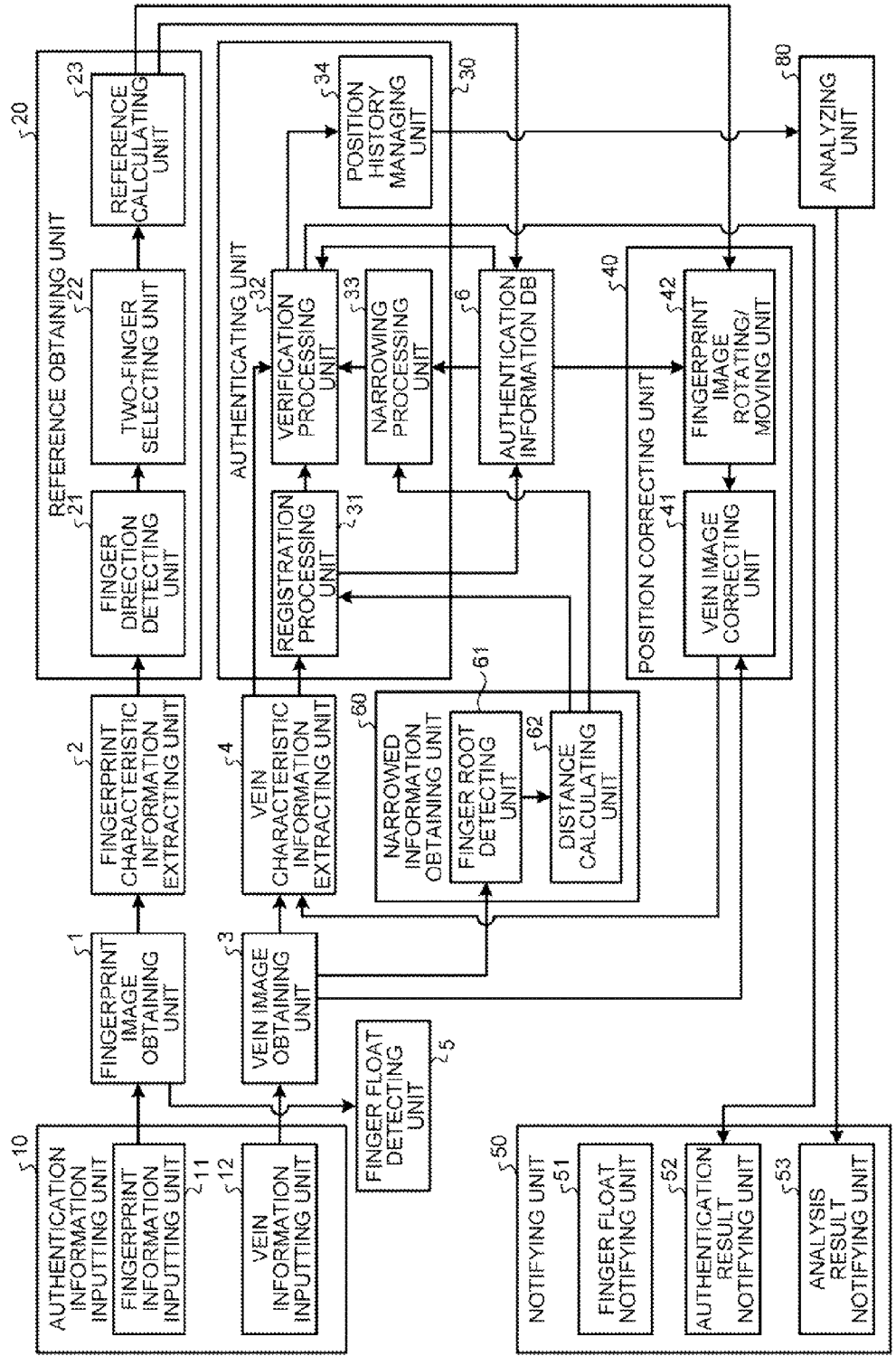
FIG. 22 is a block diagram of a biometric authentication device according to a third embodiment.

FIG. 22 is a block diagram of a third embodiment. A biometric authentication device according to the present embodiment is different from the second embodiment in that a position history on the authentication success is accumulated to analyze how to place fingers and a palm. An analysis on how to place fingers or a palm will be mainly described below. In FIG. 22, the respective units with the same reference numerals as those in FIGS. 1 and 17 have the same functions unless otherwise stated.

The biometric authentication device according to the present embodiment is such that an analyzing unit 80 and an analysis result notifying unit 53 in the notifying unit 50 are provided in addition to the respective units of the second embodiment.

When the authentication has been successfully performed, the verification processing unit 32 outputs the reference position on the authentication, the reference direction, a user identifier and time information to a position history managing unit 34. The reference position on the authentication, the reference direction and the user identifier and the time information will be referred to as "history information" below.

The position history managing unit 34 is input with the history information from the verification processing unit 32. Then, the position history managing unit 34 accumulates the received history information therein. FIG. 23 is a diagram illustrating exemplary history information on a palm-placed position. The position history managing unit 34 stores an authentication success time, the user ID, the reference position and the reference direction in the order of history number in an associated manner in a table as in a table 500 of FIG. 23, for example.

The analyzing unit 80 obtains all the history information from the position history managing unit 34 after a predetermined period of time has elapsed.

Figures 24, 25:
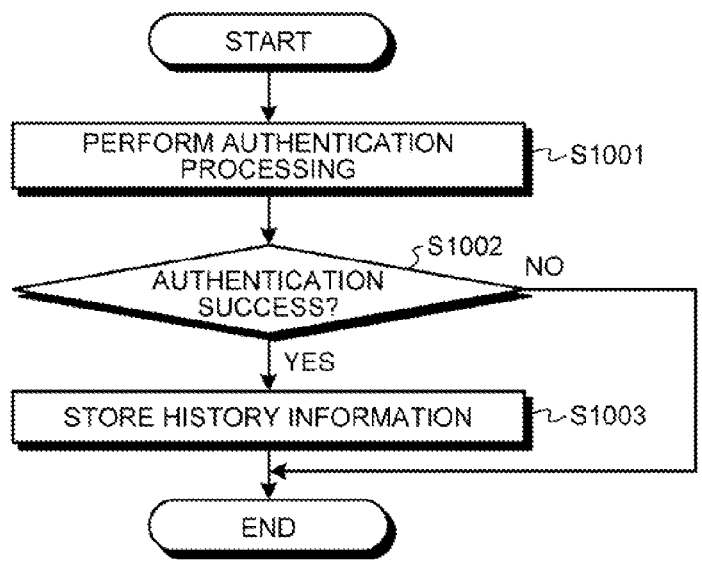
FIG. 24 is a diagram illustrating an exemplary analysis result.
FIG. 25 is a flowchart of a history information storage processing in the biometric authentication device according to the third embodiment.

Then, the analyzing unit 80 obtains the history information of the manager, that is the history information as reference information on the placement of fingers and a palm. Then, the analyzing unit 80 determines whether history information other than the history information of the manager is present in the history information obtained from the position history managing unit 34. When information other than the history information of the manager is present, the analyzing unit 80 obtains history information after the previous analysis. Then, the analyzing unit 80 calculates differences between the history information of the user (which will be referred to as "target person" below) who performs the current authentication from the obtained history information and the placement positions of the respective users. Further, the analyzing unit 80 calculates an average of the differences between the history information of the target person from the obtained history information and the placement positions of all the users. FIG. 24 is a diagram illustrating an exemplary analysis result. The analyzing unit 80 stores an average of the differences in the reference position and the reference direction to be analyzed between all the users as in a table 501 of FIG. 24. The analyzing unit 80 sequentially describes therein the average values of the differences in the reference position and the reference direction to be analyzed among the users. Then, the analyzing unit 80 outputs the table 501 as the analysis result to the analysis result notifying unit 53.

The analysis result notifying unit 53 is input with the table 501 as the analysis result from the analyzing unit 80. Then, the analysis result notifying unit 53 notifies the user of the table 501 by displaying it on the monitor, for example.

A flow of the history information storage processing in the biometric authentication device according to the present embodiment will be described below with reference to FIG. 25. FIG. 25 is a flowchart of the history information storage processing in the biometric authentication device according to the third embodiment.

The verification processing unit 32 performs the authentication processing (step S1001).

Then, the verification processing unit 32 determines whether the authentication processing has been successfully performed (step S1002). When the authentication processing has been successfully performed (Yes in step S1002), the verification processing unit 32 stores the history information in the position history managing unit 34 (step S1003). To the contrary, when determining that the authentication processing has failed (No in step S1002), the verification processing unit 32 terminates the history information storage processing.

Figure 26:
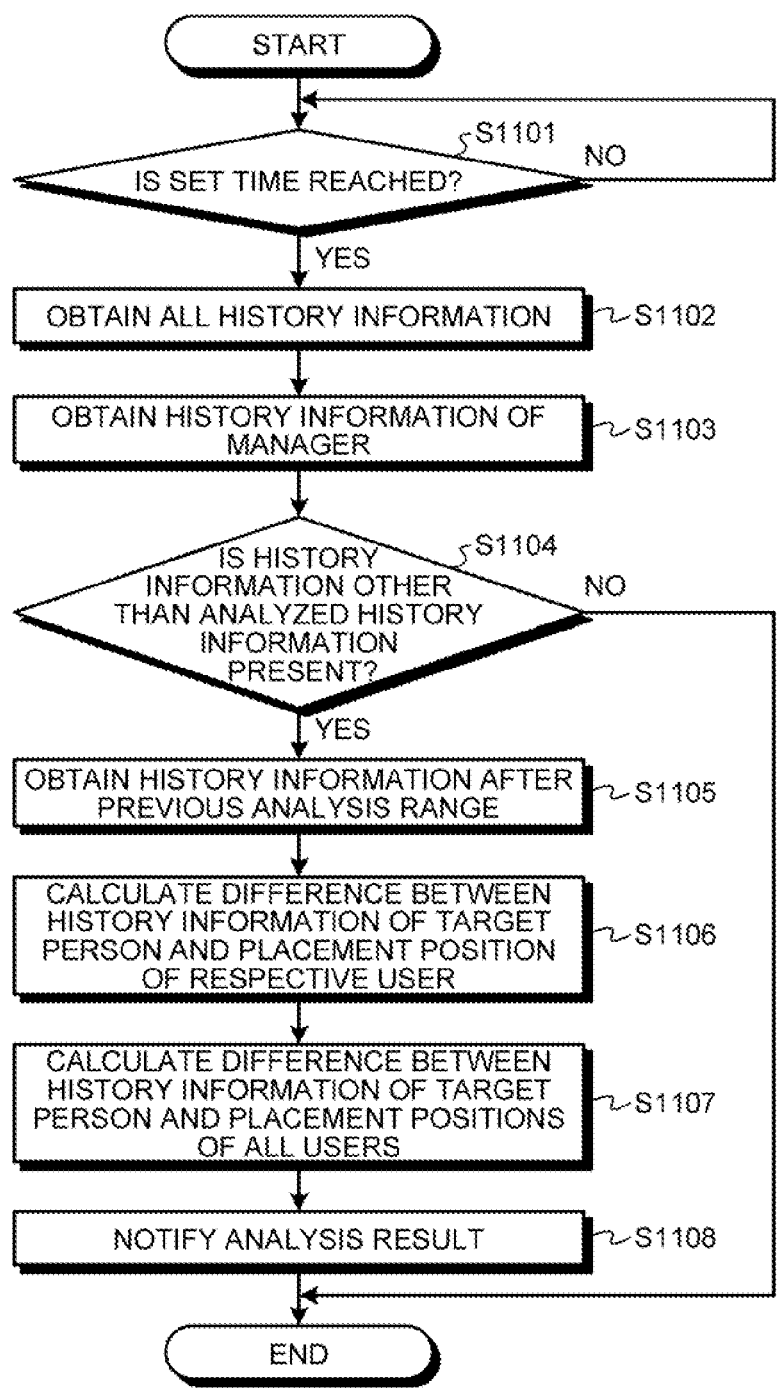
FIG. 26 is a flowchart of an analysis processing in the biometric authentication device according to the third embodiment.

A flow of the analysis processing in the biometric authentication device according to the present embodiment will be described below with reference to FIG. 26. FIG. 26 is a flowchart of the analysis processing in the biometric authentication device according to the third embodiment.

The analyzing unit 80 determines whether a set time has been reached (step S1101). When the set time has been reached (Yes in step S1101), the analyzing unit 80 obtains all the history information from the position history managing unit 34 (step S1102).

Then, the analyzing unit 80 obtains the history information of the manager, that is the analyzed history information (step S1103).

The analyzing unit 80 determines whether history information other than the analyzed history information is present in the history information obtained from the position history managing unit 34 (step S1104). When information other than the analyzed history information is not present (No in step S1104), the analyzing unit 80 terminates the analysis processing.

To the contrary, when information other than the analyzed history information is present (Yes in step S1104), the analyzing unit 80 obtains history information in the range after the previous analysis range (step S1105).

Then, the analyzing unit 80 calculates a difference between the history information on the target person on the current authentication from the obtained history information and the placement positions of the respective users (step S1106). Further, the analyzing unit 80 calculates an average of the differences between the history information of the target person from the obtained history information and the placement positions of all the users (step S1107).

Then, the analyzing unit 80 outputs the analysis result to the analysis result notifying unit 53. The analysis result notifying unit 53 notifies the user of the analysis result (step S1108).

As described above, the biometric authentication device according to the present embodiment can provide, to the user, the comparison with other users for the placement state of fingers and a palm. Thus, the user can place fingers and a palm on a more proper position than on the authentication. Further, the history of the placement positions of fingers or a palm is analyzed thereby to detect a failure of the device or an error of the method for instructing to place fingers or a palm. The device using method may be systematically instructed for all the users or part of the users. It is further possible to grasp a more proper attachment position of the sensor guide and to improve the system operation based a trend of all the users.

The input of the fingerprint information using the index finger, the middle finger and the medicinal finger has been described in the first to third embodiments described above, but other three adjacent fingers may be employed. The thumb, the little finger and the middle finger may be used.

[d] Fourth Embodiment

The biometric authentication system is such that biometric characteristic information is previously enrolled as the biometric information in the system and a similarity between the enrolled biometric information and the biometric information obtained on the authentication is determined for personal authentication. In principle, the biometric information obtained on the enrollment will not strictly match with the biometric information obtained on the authentication, and when it is determined that the similarity is low, even a person enrolled in the system may fail the authentication. A threshold for determining the similarity is reduced and thus a possibility that the person fails the authentication (false rejection rate) decreases, but in this case, a possibility that a stranger is erroneously determined as authenticated (false acceptance rate) increases. Typically, the false rejection rate and the false acceptance rate are in a contradictory relationship, but there is known a method in which multiple types of biometric information are used to execute personal authentication, thereby simultaneously reducing the rates and improving an authentication precision. The method in which multiple types of biometric information are used for authentication may be referred to as multi-biometric authentication. For example, the multi-biometric authentication may use fingerprint information and vein information.

In the biometric authentication system, the biometric information may not be suitable for authentication, such as required information for authentication cannot be obtained from the input biometric information. In this case, the user may be guided to input the biometric information suitable for authentication. For example, in the authentication using one item of biometric information, there is proposed a technique in which the input biometric information is used to generate feedback information and to notify the user of the feedback information, thereby guiding to input biometric information suitable for authentication.

However, in the multi-biometric authentication, the information to be fed back to the user of the biometric authentication device and the method therefor are different between when the authentication using the biometric information is individually performed and when the input contents are not suitable for the verification processing. In other words, when existing feedback information is used for the multi-biometric authentication in the individual authentication, the feedback on any item of biometric information is reflected for input, and consequently other biometric information cannot be accurately input.

A fourth embodiment and fifth embodiment have been made in terms of the above points, and it is an object thereof to provide a biometric authentication device capable of generating feedback information in consideration of the input states of the respective items of biometric information.

Figure 27:
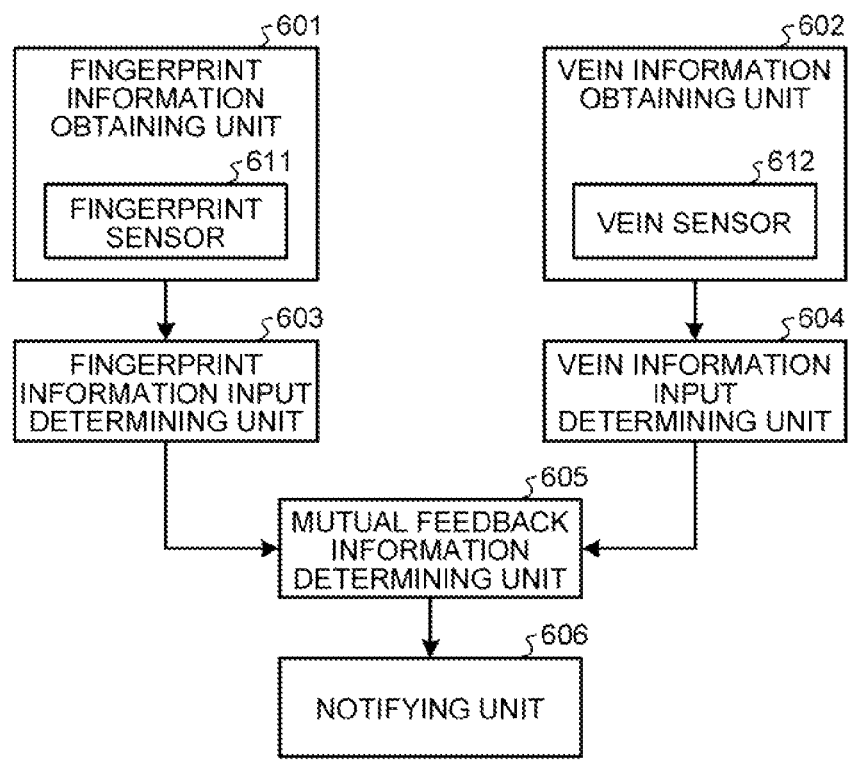
FIG. 27 is a block diagram of a biometric authentication device according to a fourth embodiment.

FIG. 27 is a block diagram of the fourth embodiment. The biometric authentication device according to the present embodiment has a fingerprint information obtaining unit 601, a vein information obtaining unit 602, a fingerprint information input determining unit 603, a vein information input determining unit 604, a mutual feedback information determining unit 605 and a notifying unit 606 as illustrated in FIG. 27.

The fingerprint information obtaining unit 601 has a fingerprint sensor 611. Then, the user can input fingerprint information by placing fingers on the fingerprint sensor 611. The fingerprint information obtaining unit 601 obtains the fingerprint information input from the fingerprint sensor 611.

The vein information obtaining unit 602 has a vein sensor 612. Then, the user can input vein information by placing fingers on the vein sensor 612. The vein information obtaining unit 602 obtains the vein information input from the vein sensor 612.

The fingerprint information input determining unit 603 detects a fingerprint region from the fingerprint information obtained by the fingerprint information obtaining unit 601. Then, the fingerprint information input determining unit 603 detects fingerprint position information per finger from the detected fingerprint region. Herein, the fingerprint position information is a fingerprint center position, a gravity center position of the fingerprint region, or four position coordinates of a rectangle indicating the fingerprint region, for example. In the present embodiment, the fingerprint center is used as the fingerprint position information. The fingerprint information input determining unit 603 stores a fingerprint reference position which is a reference position for an imaging region of the fingerprint sensor 611. Then, the fingerprint information input determining unit 603 determines a fingerprint input state based on a relationship between the received fingerprint position information and the predetermined fingerprint reference position. Herein, the determination as to the fingerprint input state is a fingerprint input position state on the imaging region of the fingerprint sensor 611, such as being so right or upper from the imaging region of the fingerprint sensor 611.

The vein information input determining unit 604 detects a vein region from the vein information obtained from the vein information obtaining unit 602. Then, the vein information input determining unit 604 detects vein position information from the detected vein region. Herein, the vein position information is a position of the wrist or the root of each finger, for example, and the position of the wrist is a position which is a border between the palm and the wrist and at which an angle of a contour line changes when the right and left ends of the line of the wrist or the contour line of the hand is traced. In the present embodiment, the right and left ends of the line of the wrist are used as the vein position information. The vein information input determining unit 604 stores a vein reference position which is a reference position for the imaging region of the vein sensor 612. The vein information input determining unit 604 determines a vein input state based on a relationship between the received vein position information and the predetermined vein reference position. Herein, the determination as to the vein input state is a vein input position state on the imaging region of the vein sensor 612, such as being so right or upper from the imaging region of the vein sensor 612.

The mutual feedback information determining unit 605 is input with a determination result of the fingerprint input state from the fingerprint information input determining unit 603. Further, the mutual feedback information determining unit 605 is input with a determination result of the vein input state from the vein information input determining unit 604. Then, the mutual feedback information determining unit 605 determines the contents to be notified to the user based on the determination result on the fingerprint and vein input states. When the fingerprint centers are not detected and when the position of the wrist is detected, the finger tips are out of the imaging region of the fingerprint sensor 611, and thus the mutual feedback information determining unit 605 determines to move the finger tips toward the wrist. When the bases of finger are positioned between the imaging region of the fingerprint sensor 611 and the imaging region of the vein sensor 612 and are not detected, the mutual feedback information determining unit 605 determines to move the bases of finger toward the wrist. When the position of the wrist is not detected and the fingerprint centers are detected, the mutual feedback information determining unit 605 determines to move the position of the wrist toward the finger tips. For the horizontal deviation, the vein is less related to the fingerprint and the information on the two is individually addressed, and the mutual feedback information determining unit 605 does not determine a mutual relationship and determines a positional alignment similar to that when the vein and the fingerprint are individually addressed.

Then, the mutual feedback information determining unit 605 calculates a permitted amount by which the fingerprint position can be moved based on position information on each fingerprint and the imaging region of the fingerprint sensor 611. For example, the fingerprint position is to be guided toward the finger tips, the mutual feedback information determining unit 605 moves the current fingerprint position toward the finger tips, and calculates a distance up to the end of the imaging region of the fingerprint sensor 611 to assume a calculated value as the permitted amount. Further, the mutual feedback information determining unit 605 calculates a permitted amount by which the palm position can be moved based on the vein position information and the imaging region of the vein sensor 612. For example, the mutual feedback information determining unit 605 calculates a permitted amount from the relationship between the current wrist position or the base of finger positions and the imaging region of the vein sensor 612.

Then, the mutual feedback information determining unit 605 finds a moving direction and a moving amount to move within the calculated permission as determined above. For example, the mutual feedback information determining unit 605 determines to move the hand toward the finger tips by 3 cm. Then, the mutual feedback information determining unit 605 outputs the information on the moving direction and the moving amount as the feedback information to the notifying unit 606.

Herein, for almost everyone, the entire hand is accommodated within the imaging regions of the fingerprint sensor 611 and the vein sensor 612 from a typical shape of a person's hand. In this case, the mutual feedback information determining unit 605 can guide the user's hand to a proper position by instructing to move within the permitted range. However, when a person has so long fingers or hands, the fingerprints and the wrist position may not be accommodated within the imaging regions. The mutual feedback information determining unit 605 previously stores therein a priority order of the information to be obtained. For example, the mutual feedback information determining unit 605 stores a table indicating the priority order of the position information. In the present embodiment, the mutual feedback information determining unit 605 stores the fingerprint center position as the priority order 1, the wrist position as the priority order 2, and the base of finger position as the priority order 3. The priority order is determined for obtaining both the fingerprint and the palm in order to perform both the fingerprint authentication and the vein authentication in the present embodiment. In the vein authentication, both the palm position and the base of finger positions are preferably obtained, but are not essential for making the verification. To the contrary, when the fingerprint center cannot be detected due to a missing region of the fingerprint, the fingerprint authentication cannot be stably performed and thus the fingerprint center position is assumed to have the priority order 1. Further, when the verification processing or the narrowing processing is performed by detecting the lengths of the fingers from the fingerprint information and the vein information, the base of finger position has an upper priority order than the wrist position, and thus the base of finger position has the priority order 2 and the wrist position has the priority order 3. Then, when the hand is not accommodated within the imaging regions for the movement within the permitted range, the mutual feedback information determining unit 605 determines the moving direction and the moving amount depending on the priority order in the table indicating the priority order of the position information.

The notifying unit 606 is input with information on the moving direction and the moving amount from the mutual feedback information determining unit. The notifying unit 606 notifies the user of the feedback information by displaying it on the monitor or the like, and guides the user's hand to a proper position.

Figure 28:
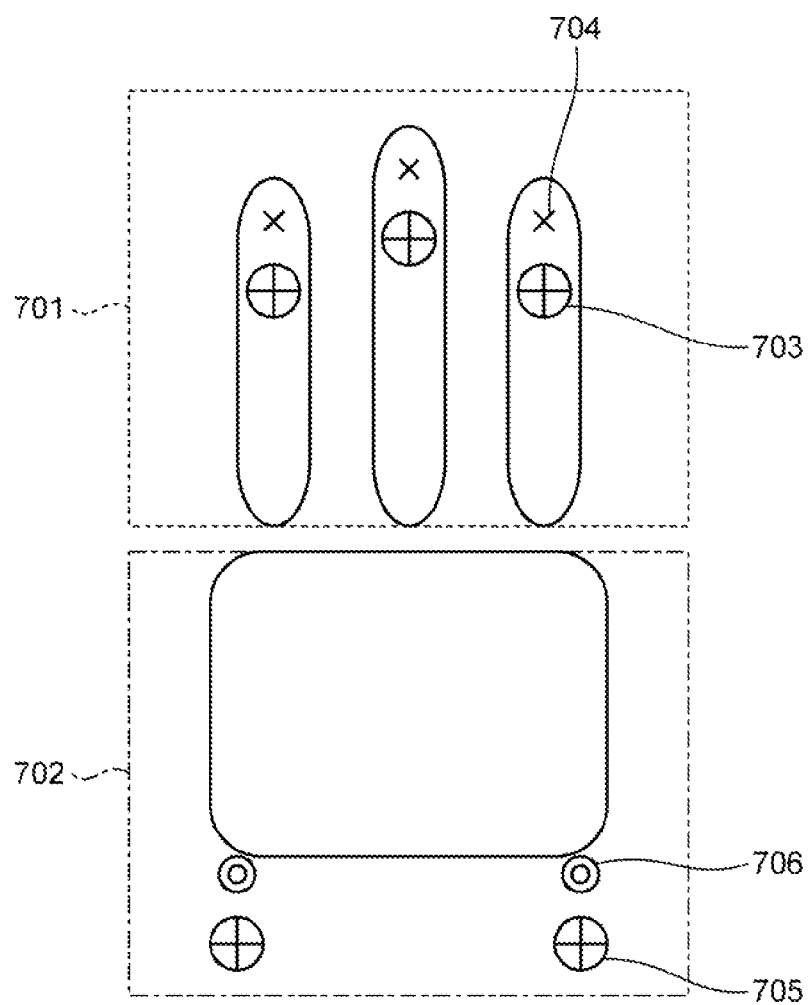
FIG. 28 is a diagram for explaining how to guide fingers and a palm according to the fourth embodiment.
Figure 29:
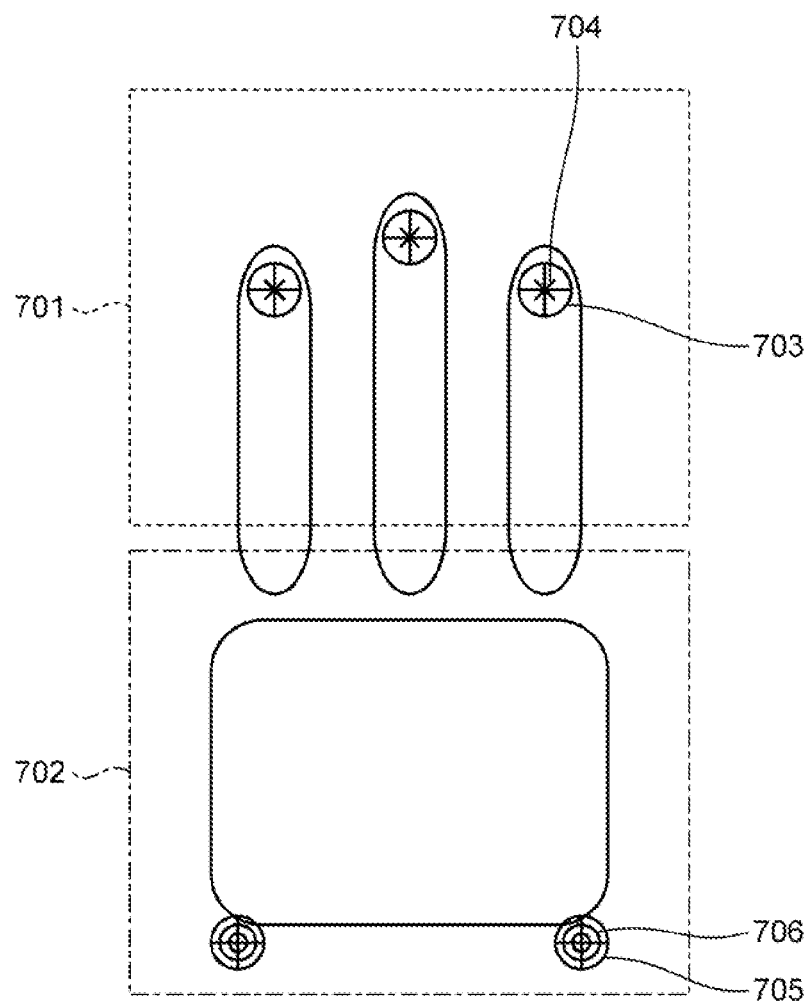
FIG. 29 is a diagram illustrating the guided fingers and palm.

FIG. 28 is a diagram for explaining how to guide the fingers and the palm according to the fourth embodiment. A region 701 is an imaging region of the fingerprint sensor 611, and a region 702 is an imaging region of the vein sensor 612. Then, the notifying unit 606 indicates the current fingerprint center position with a marker 704. FIG. 28 explains the marker of the fingerprint center of the medicinal finger by way of example, but the notifying unit 606 indicates the current position of the fingerprint center of each finger as illustrated. Further, the notifying unit 606 indicates the current wrist position with a marker 706. The marker indicating the medicinal finger side of the wrist is described by way of example, but the notifying unit 606 also indicates a marker indicating the index finger side of the wrist as illustrated. Then, the notifying unit 606 indicates a moving destination position of the fingerprint center of each finger with a marker 703. Further, the notifying unit 606 indicates a moving destination position of the wrist with a marker 705. The user moves the fingers and the palm such that the fingerprint center is positioned on the marker 703 and the wrist is positioned on the marker 705. FIG. 29 is a diagram illustrating the guided fingers and palm. As illustrated in FIG. 29, the user moves the fingers and the palm according to the guidance so that the marker 703 and marker 704 match and the marker 705 and the marker 706 match. In FIG. 28, the base of finger positions are not within the region 702, but in FIG. 29, it is seen that the base of finger positions are within the region 701 and are guided to the proper positions.

There has been described in the above explanation that the fingerprint sensor 611 and the vein sensor 612 are horizontal relative to the sensor faces, but it may be considered that they are vertical relative to the sensor faces. For example, when the vein information input determining unit 604 determines that the palm is deviated from the sensor face, the mutual feedback information determining unit 605 moves the hand toward the finger tips and thus a wider range of the palm is placed on the sensor face, thereby improving the deviation of the palm.

Figure 30:
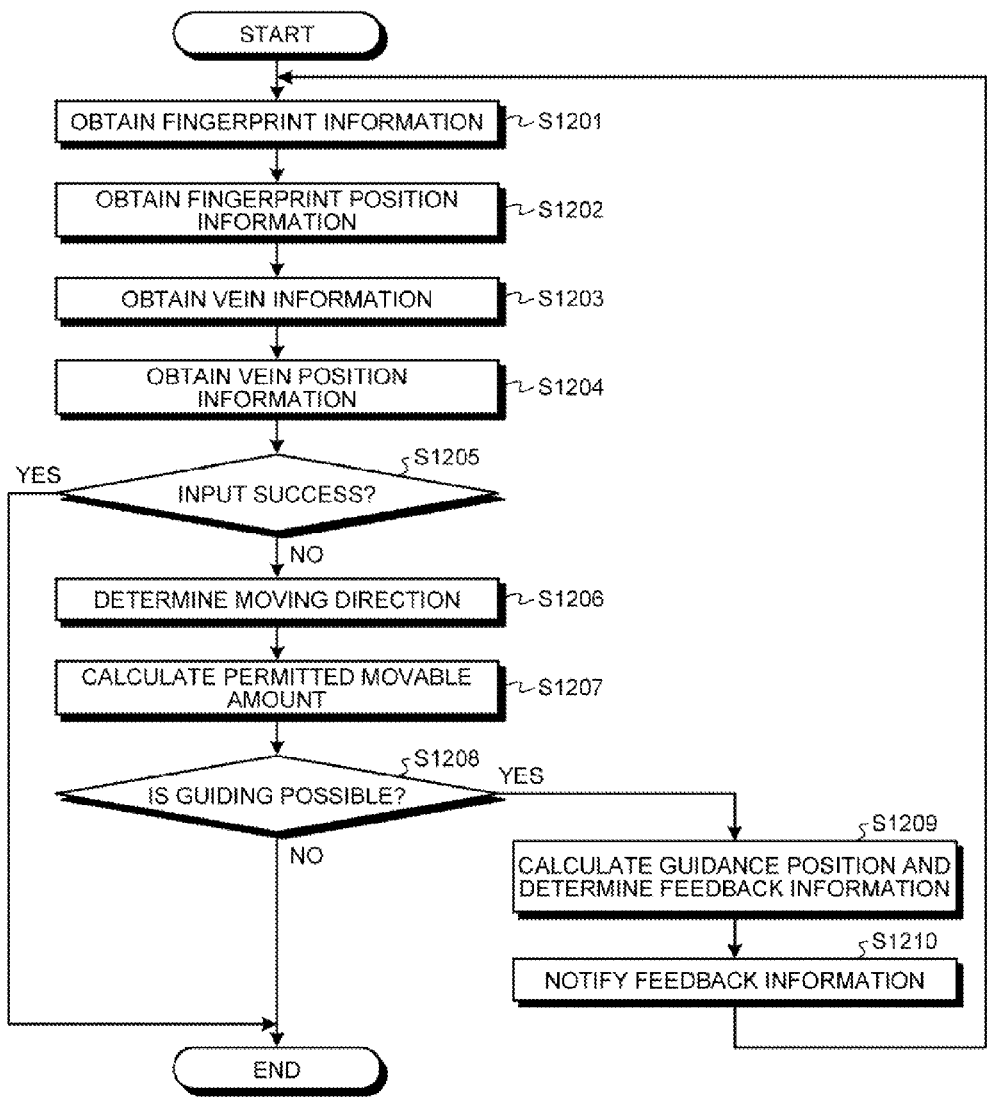
FIG. 30 is a flowchart of an analysis processing in the biometric authentication device according to the fourth embodiment.

A flow of the analysis processing in the biometric authentication device according to the present embodiment will be described below with reference to FIG. 30. FIG. 30 is a flowchart of the analysis processing in the biometric authentication device according to the fourth embodiment.

The fingerprint information obtaining unit 601 obtains the fingerprint information from the image of the fingers placed on the fingerprint sensor 611 (step S1201).

Then, the fingerprint information input determining unit 603 receives the fingerprint information from the fingerprint information obtaining unit 601, and obtains the fingerprint position information (step S1202).

The vein information obtaining unit 602 obtains the vein information from the vein image of the palm placed on the vein sensor 612 (step S1203).

Then, the vein information input determining unit 604 receives the vein information from the vein information obtaining unit 602, and obtains the vein position information (step S1204).

The mutual feedback information determining unit 605 determines whether the authentication information on the fingerprints and the vein has been successfully input based on the fingerprint position information and the vein position information (step S1205). When the input has been successfully performed (Yes in step S1205), the mutual feedback information determining unit 605 terminates the analysis processing.

To the contrary, when the input has failed (No in step S1205), the mutual feedback information determining unit 605 determines a moving direction of the fingers and the palm based on the fingerprint position information and the vein position information (step S1206).

Then, the mutual feedback information determining unit 605 calculates a permitted movable amount (step S1207).

Then, the mutual feedback information determining unit 605 determines whether the guiding is possible (step S1208). When the guiding is not possible (No in step S1208), the mutual feedback information determining unit 605 terminates the analysis processing.

To the contrary, when the guiding is possible (Yes in step S1208), a guidance position is calculated and feedback information is determined (step S1209).

Then, the notifying unit 606 notifies the user of the feedback information received from the mutual feedback information determining unit 605 (step S1210) and then returns to step S1201.

As described above, the biometric authentication device according to the present embodiment guides the positions of the fingerprints and the vein to proper positions based on the fingerprint information and the vein information. Thus, both the fingerprints and the vein can be guided to the proper positions, thereby enhancing the efficiency of the authentication processing and the accuracy of the authentication.

[e] Fifth Embodiment

Figure 31:
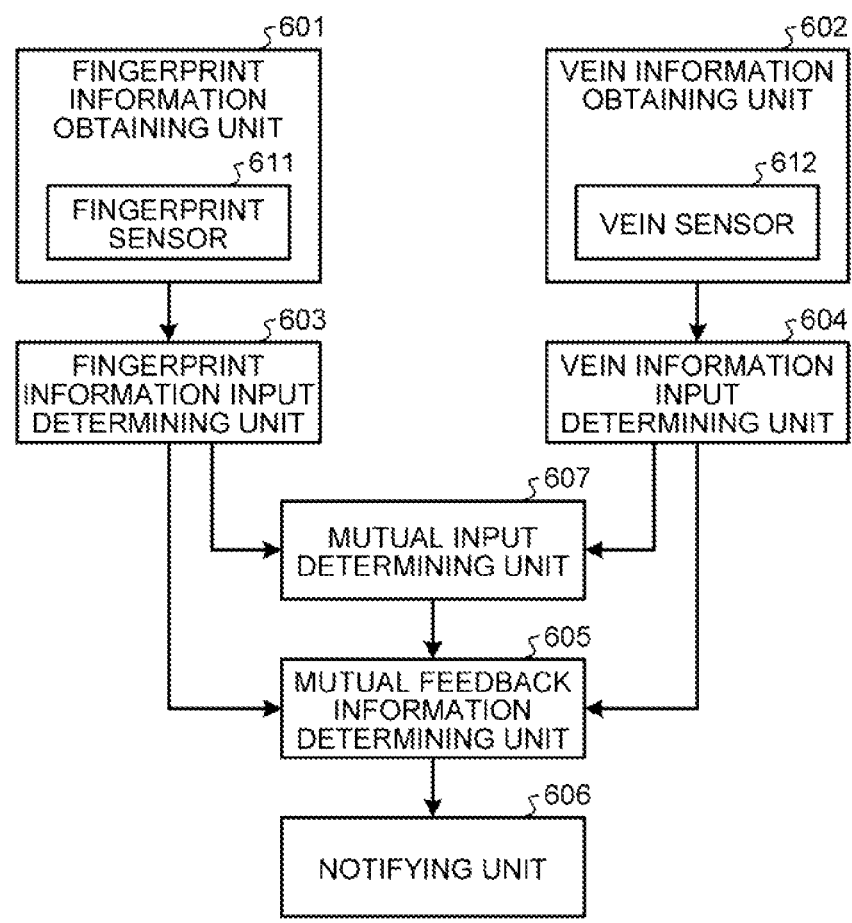
FIG. 31 is a block diagram of a biometric authentication device according to a fifth embodiment.

FIG. 31 is a block diagram of a fifth embodiment. A biometric authentication device according to the present embodiment is different from the fourth embodiment in that one of the fingerprint information and the vein information is analyzed to determine whether the input contents of the other information are suitable for authentication. In FIG. 31, the respective units with the same reference numerals as those in FIG. 27 have the same functions unless otherwise stated.

The biometric authentication device according to the present embodiment is such that a mutual input determining unit 607 is provided in addition to the respective units of the fourth embodiment.

The mutual input determining unit 607 is input with the fingerprint information from the fingerprint information input determining unit 603. Further, the mutual input determining unit 607 is input with the vein information from the vein information input determining unit 604. Then, the mutual input determining unit 607 uses the fingerprint information to determine whether the input vein information is suitable for the verification processing. Further, the mutual input determining unit 607 uses the vein information to determine whether the input fingerprint information is suitable for the verification.

For example, the mutual input determining unit 607 detects the fingerprint input positions from the fingerprint information. Then, the mutual input determining unit 607 determines how the fingers are spread depending on distances between the input positions of the respective fingerprints. Specifically, the mutual input determining unit 607 determines that the fingers are not spread when the input positions of the respective fingerprints are closer than the threshold. Then, when the fingers are not spread, the mutual input determining unit 607 cannot determine a direction of the center finger based on the directions of the fingers at both ends among the three adjacent fingers, and thus determines that the input vein information is not suitable for the vein information authentication processing. To the contrary, when the input positions of the respective fingerprints are separated than the threshold, the mutual input determining unit 607 determines that the fingers are sufficiently spread, and determines that the input vein information is suitable for the vein information authentication processing.

For example, the mutual input determining unit 607 detects how the fingers are pressed onto the fingerprint sensor 611 from the fingerprint information. Then, when it is determined that the press force is strong, the palm is also considered as pressed strongly along with the press force of the fingers, and thus the mutual input determining unit 607 determines that the input vein information is not suitable for the vein information verification processing. For example, the mutual input determining unit 607 may use a contrast ratio of the fingerprint image as a press force determining method. For the fingerprint image obtained as the fingerprint information, typically ridge regions contacting on the sensor face look black and valley regions non-contacting on the sensor face look white based on the unevenness of the fingerprints. In other words, when the press force of the fingers on the sensor face is strong, the ridges are collapsed and the valleys are thin so that the regions of the black pixels increase. Thus, the mutual input determining unit 607 finds the contrast ratio of the fingerprint input region, that is a rate of the black pixels, and can determine whether the fingers are pressed strongly based on whether the rate exceeds a predetermined threshold.

For example, the mutual input determining unit 607 detects the base of finger positions from the vein information. The mutual input determining unit 607 determines whether the fingerprint information not suitable for the verification processing has been input or whether the fingerprint is a waveform pattern (whorl pattern) as one type of fingerprint pattern depending on the heights of the root positions, for example. In the fingerprint authentication, when the fingerprints at the finger tips are obtained, the fingerprint center positions usable as the reference of the position alignment of the fingerprint verification are difficult to detect and the verification may fail due to an erroneous position alignment in many cases. Further, the fingerprints at the finger tips are basically occupied by the lateral waveform patterns and the amount of information by which the fingerprints are identified is less, and a stranger is frequently and erroneously authenticated as the person. However, the fingerprints of the finger tips and the fingerprints having a waveform pattern have similar characteristics, and thus they are difficult to determine only based on the fingerprint information. Thus, the mutual input determining unit 607 uses the vein information to detect the base of finger positions, and when the base of finger positions are upper than the palm, determines that the fingerprints at the finger tips have been input.

The mutual feedback information determining unit 605 uses the determination result of the mutual input determining unit 607 to determine the contents to be notified to the user. For example, when the mutual input determining unit 607 determines that the fingers are not spread, the mutual feedback information determining unit 605 determines the notification contents to spread the fingers.

Figure 32:
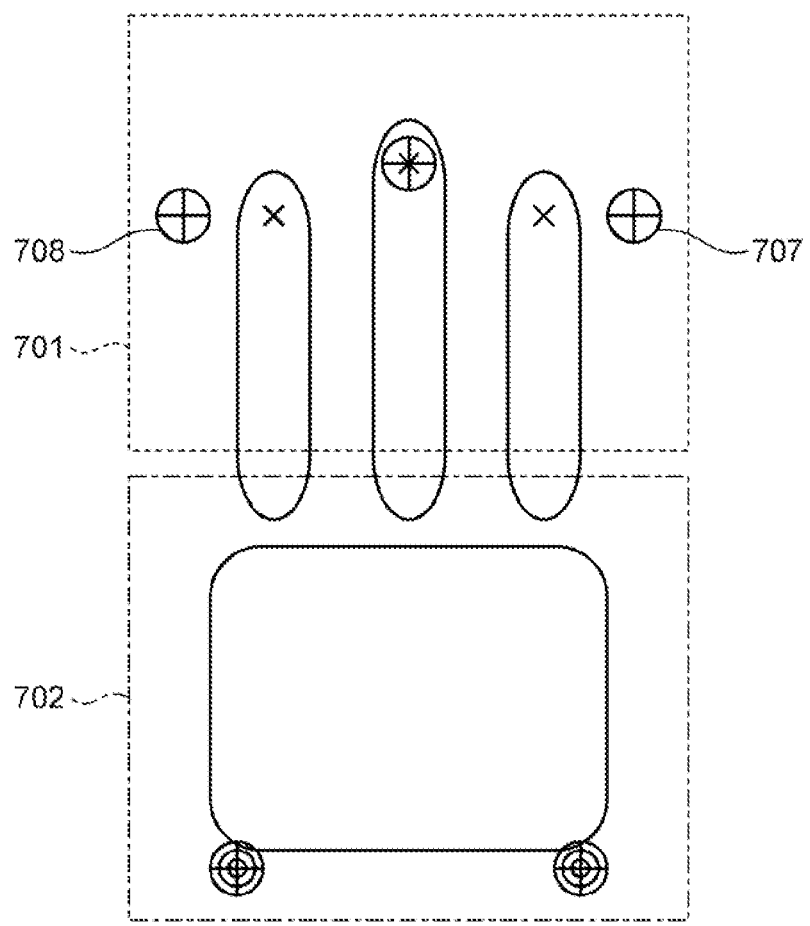
FIG. 32 is a diagram for explaining how to guide fingers according to the fifth embodiment.

Then, the notifying unit 606 receives the notification contents from the mutual feedback information determining unit 605 and notifies it to the user. FIG. 32 is a diagram for explaining how to guide the fingers according to the fifth embodiment. When receiving the notification contents to spread the fingers, for example, the notifying unit 606 displays a marker 707 and a marker 708 outside the positions of the index finger and the medicinal finger as illustrated in FIG. 32. The notifying unit 606 displays the marker overlapped on the fingerprint center of the middle finger to keep the position of the middle finger. Thus, the user aligns the index finger and the medicinal finger on the marker 707 and the marker 708 thereby to place the fingers in a spread manner on the sensor.

As described above, the biometric authentication device according to the present embodiment uses the fingerprint information to determine the vein information input state and guides to improve its state, and uses the vein information to determine the fingerprint information input state and guides to improve its state. Thus, the state which cannot be determined only by one item of information can be determined and thus the fingers and the palm can be more properly guided.

The input of the fingerprint information using the index finger, the middle finger and the medicinal finger has been described in the fourth and fifth embodiments described above, but any number of fingers but one may be used and any fingers may be used.

According to one aspect of the biometric authentication device, the biometric information processing device, the biometric authentication system, the biometric authentication server, the biometric authentication client and the biometric authentication device controlling method disclosed in the present application, there is obtained an effect that even when the degree of freedom of how to place a palm is enhanced, highly accurate authentication can be executed in a simple enrollment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication device comprising:
    a fingerprint sensor configured to have a region on which multiple fingers are to be placed;
    a vein sensor configured to have a region on which a palm is to be placed; and
    a processer configured to execute a process including:
    obtaining fingerprint information from fingerprints of fingers recognized by the fingerprint sensor;
    obtaining vein information from a palm recognized by the vein sensor;
    obtaining fingerprint position information indicating fingerprint positions on the fingerprint sensor from the fingerprint information;

obtaining palm position information indicating a palm position on the vein sensor from the vein information;
determines how a palm is placed on the vein sensor based on one of or both the fingerprint information and the fingerprint position information, and how fingers are placed on the fingerprint sensor based on one of or both the vein information and the palm position information;
determining position correcting information on one of or both the fingerprint position and the palm position based on how fingers are placed on the fingerprint sensor and how a palm is placed on the vein sensor; and
notifying position correcting information obtained by the determining.

2. A biometric information processing device comprising:
a fingerprint sensor configured to have a region on which multiple fingers are to be placed;
a vein sensor configured to have a region on which a palm is to be placed; and
a processer configured to execute a process including:
obtaining fingerprint information from fingerprints of fingers recognized by the fingerprint sensor;
obtaining vein information from a palm recognized by the vein sensor;
obtaining fingerprint position information indicating fingerprint positions on the fingerprint sensor from the fingerprint information;
obtaining palm position information indicating a palm position on the vein sensor from the vein information;
determines how a palm is placed on the vein sensor based on one of or both the fingerprint information and the fingerprint position information, and how fingers are placed on the fingerprint sensor based on one of or both the vein information and the palm position information;
determining position correcting information on one of or both the fingerprint position and the palm position based on how fingers are placed on the fingerprint sensor and how a palm is placed on the vein sensor; and
notifying position correcting information obtained by the determining.

* * * * *